United States Patent — Bu

(10) Patent No.: US 11,966,908 B2
(45) Date of Patent: *Apr. 23, 2024

(54) SECURE DATA MANAGEMENT FOR SENSITIVE INFORMATION

(71) Applicant: Stripe, Inc., South San Francisco, CA (US)

(72) Inventor: Yue Bu, Oakland, CA (US)

(73) Assignee: Stripe, Inc., South San Francisco, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/871,478

(22) Filed: Jul. 22, 2022

(65) Prior Publication Data

US 2022/0358480 A1  Nov. 10, 2022

Related U.S. Application Data

(63) Continuation of application No. 16/824,454, filed on Mar. 19, 2020, now Pat. No. 11,429,951, which is a continuation of application No. 15/789,668, filed on Oct. 20, 2017, now abandoned.

(51) Int. Cl.
*G06Q 20/32* (2012.01)
*G06Q 20/38* (2012.01)

(52) U.S. Cl.
CPC ......... *G06Q 20/325* (2013.01); *G06Q 20/385* (2013.01)

(58) Field of Classification Search
CPC .. G06Q 20/325; G06Q 20/385; G06Q 20/341; G06Q 20/401; G06Q 20/12
See application file for complete search history.

(56) References Cited

U.S. PATENT DOCUMENTS

| 5,450,538 A | * | 9/1995 | Glaser | G06F 9/451 715/236 |
|---|---|---|---|---|
| 6,601,759 B2 | | 8/2003 | Fife et al. | |
| 7,911,452 B2 | | 3/2011 | Kang et al. | |
| 7,984,113 B2 | | 7/2011 | Steinwagner | |
| 9,600,651 B1 | | 3/2017 | Ryan et al. | |

(Continued)

FOREIGN PATENT DOCUMENTS

| EP | 3070662 A1 * | 9/2016 | ......... G06F 21/6245 |
|---|---|---|---|
| EP | 3767567 A1 * | 1/2021 | ........... G06Q 20/085 |

OTHER PUBLICATIONS

Babish, Nick: Designing Perfect Text Field: Clarity, Accessibility and User Effort, Aug. 4, 2016, UX Planet: Medium, pp. 1-17 (Year: 2016).*

(Continued)

*Primary Examiner* — Bijendra K Shrestha
(74) *Attorney, Agent, or Firm* — BAKERHOSTETLER

(57) ABSTRACT

Methods, systems, and computer readable medium are provided for generating, by a secure processor, a plurality of configurable data entry elements configured into a webpage, receiving sensitive data entered via the plurality of configurable data entry elements during a user data entry session, generating a hidden controller iframe in the webpage, aggregating, by the hidden controller iframe, the sensitive data across the plurality of configurable data entry elements, and directing aggregated sensitive data to the secure processor hosted by a first server separate from a second server hosting the webpage.

20 Claims, 24 Drawing Sheets

(56) References Cited

U.S. PATENT DOCUMENTS

| | | | |
|---|---|---|---|
| 9,942,244 | B2 | 4/2018 | Lahoz et al. |
| 2001/0055020 | A1* | 12/2001 | Hertzfeld ............ G06F 40/109 |
| | | | 345/472 |
| 2003/0212642 | A1 | 11/2003 | Weller et al. |
| 2010/0293017 | A1 | 11/2010 | Merritt et al. |
| 2011/0216702 | A1 | 9/2011 | Yoon |
| 2013/0110658 | A1 | 5/2013 | Lyman |
| 2013/0117185 | A1* | 5/2013 | Collison ............ G06Q 20/385 |
| | | | 705/67 |
| 2014/0012922 | A1 | 1/2014 | Wu |
| 2016/0104079 | A1 | 4/2016 | Greenberg et al. |
| 2019/0082043 | A1 | 3/2019 | Lavian et al. |

OTHER PUBLICATIONS

PCI Guru: Third party Provider PCI Compliance, Jul. 18, 2016, pp. 1-6 (Year: 2016).*
Stanger, Mark: Modifying the Label of Form, Oct. 10, 2011, Service Now Guru, pp. 1-3 (Year: 2011).*
Pasquet et al.: E-Payment Security: Which Solutions for Which Issues? Oct. 2009, Research Gate, pp. 1-31 (Year: 2009).*
"U.S. Appl. No. 16/824,454, Examiner Interview Summary dated Feb. 17, 2022", 3 pgs.
"U.S. Appl. No. 16/824,454, Examiner Interview Summary dated Mar. 11, 2022", 5 pgs.
"U.S. Appl. No. 16/824,454, Final Office Action dated Feb. 16, 2021", 13 pgs.
"U.S. Appl. No. 16/824,454, Non-Final Office Action dated Oct. 21, 2020", 12 pgs.
"U.S. Appl. No. 16/824,454, Non-Final Office Action dated Nov. 17, 2021", 17 pgs.
"U.S. Appl. No. 16/824,454, Notice of Allowance dated Apr. 25, 2022", 7 pgs.
"U.S. Appl. No. 16/824,454, Response filed Jan. 21, 2021 to Non-Final Office Action dated Oct. 21, 2020", 9 pgs.
"U.S. Appl. No. 16/824,454, Response filed May 10, 2021 to Final Office Action dated Feb. 16, 2021", 10 pgs.
Meloni, J.C., "Sams Teach Yourself HTML, CSS, and JavaScript All in One", © 2012 Pearson Education, Inc., (2012), 608 pgs.
Rogersnm, "Remove Stripe iFrame when StripeProvider unmounts #99", [online]. Retrieved from the Internet: <URL: https://github.com/stripe-archive/react-stripe-elements/issues/99>, (2017), 17 pgs.
Smschick, "Loading Stripe.js asynchronously causes multiple Stripe iFrames in Body #235", [online]. Retrieved from the Internet: <https://github.com/stripe-archive/react-stripe-elements/issues/235>, (2018), 6 pgs.
U.S. Appl. No. 15/789,668, filed Oct. 20, 2017, Configurable Data Entry Elements.
U.S. Appl. No. 16/824,454 U.S. Pat. No. 11,429,951, Mar. 19, 2020, Secure Data Management for Sensitive Information.
"U.S. Appl. No. 15/789,668, Advisory Action dated Feb. 13, 2020", 5 pgs.
"U.S. Appl. No. 15/789,668, Advisory Action dated Sep. 21, 2018", 3 pgs.
"U.S. Appl. No. 15/789,668, Examiner Interview Summary dated Jan. 13, 2020", 4 pgs.
"U.S. Appl. No. 15/789,668, Examiner Interview Summary dated Oct. 7, 2019", 3 pgs.
"U.S. Appl. No. 15/789,668, Final Office Action dated Jul. 10, 2018", 18 pgs.
"U.S. Appl. No. 15/789,668, Final Office Action dated Nov. 20, 2019", 12 pgs.
"U.S. Appl. No. 15/789,668, Non Final Office Action dated Jan. 10, 2018", 20 pgs.
"U.S. Appl. No. 15/789,668, Non Final Office Action dated Sep. 12, 2019", 22 pgs.
"U.S. Appl. No. 15/789,668, Response filed Jan. 17, 2020 to Final Office Action dated Nov. 20, 2019", 18 pgs.
"U.S. Appl. No. 15/789,668, Response filed Apr. 9, 2018 to Non Final Office Action dated Jan. 10, 2018", 20 pgs.
"U.S. Appl. No. 15/789,668, Response filed Sep. 10, 2018 to Final Office Action dated Jul. 10, 2018", 17 pgs.
"U.S. Appl. No. 15/789,668, Response filed Oct. 28, 2019 to Non-Final Office Action dated Sep. 12, 2019", 16 pgs.
"U.S. Appl. No. 15/789,668, Supplementary Response filed Sep. 19, 2018 to Final Office Action dated Jul. 10, 2018", 13 pgs.
"U.S. Appl. No. 16/824,454, Non Final Office Action dated Oct. 21, 2020".
Meloni, J.C., "Meloni, J.C. (2012). Sams teach yourself HTML, CSS, and JavaScript all in one. Indianapolis, IN: Sams Pub. (Year: 2012)", (2012), 608 pgs.
Rogersnm, "Remove Stripe iFrame when StripeProvider unmounts #99", <https://github.com/stripe-archive/react-stripe-elements/issues/99>, (2017).
Smschick, "Loading Stripe.js asynchronously causes multiple Stripe iFrames in Body #235", <https://github.com/stripe-archive/react-stripe-elements/issues/235>, (2018).

* cited by examiner

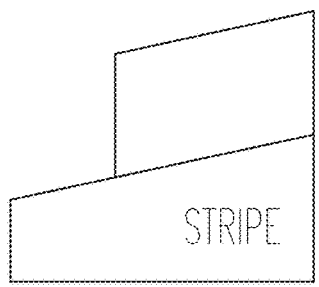
Fig. 6

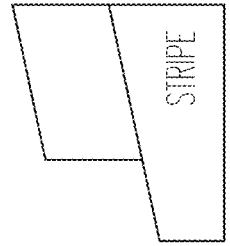
Fig. 8

SECURE DATA MANAGEMENT FOR SENSITIVE INFORMATION

CROSS-REFERENCE TO RELATED APPLICATION

This application is a continuation of U.S. patent application Ser. No. 16/824,454, filed Mar. 19, 2020, which is a continuation of U.S. patent application Ser. No. 15/789,668, filed Oct. 20, 2017, which applications are incorporated herein by reference in their entirety.

TECHNICAL FIELD

The subject matter disclosed herein generally relates to the technical field of special-purpose machines that facilitate secure data handling by providing a configurable user interface for the receipt of sensitive information.

BACKGROUND

The present disclosure seeks to address technical problems existing in conventional payment processors. For example, many merchants have a need to accept online payments in the course of doing online business. Certain aspects of payment information, for example certain parts or details of credit card numbers, are regulated and protected by strict (PCI) requirements. In order to address these requirements, most online merchants direct their customers to third-party payment sites for receipt of payment information and completion of their sales transactions. In this way, the protected aspects of the payment information can be withheld from the merchant, and handled instead by the third party site.

Nevertheless, the inconvenience of having to refer customers to another site is not ideal. The merchant has at least temporarily lost the customer from its website, the redirection may not work reliably, no payment may in fact occur, and the merchant may lose a customer to a competitor as a result.

On the other hand, if a merchant seeks to handle payments directly and to accept protected payment information while remaining in compliance with the (PCI) code, the merchant then needs to be concerned about stripping card details from payment form submissions and developing extensive code to handle validation and formatting in the course of building a safe and reliable website checkout form.

Existing payment systems can, in any event, create tremendous burdens on merchant customer service centers. For example, if the service center receives certain card information (e.g., more than just the first 6 or last 4 of a Primary Account Number "PAN", or a Card Verification Value "CVV" or Code "CVC") it may cause the entire merchant operation (not just the customer service center) to fall within scope of the (PCI) regulations and require special encryption protocols throughout.

The present disclosure seeks to provide technical solutions to these technical problems, and provide safe and convenient methods for handling regulated (PCI) payment information and other sensitive information.

BRIEF DESCRIPTION OF THE DRAWINGS

Some embodiments are illustrated by way of example and not limitation in the figures of the accompanying drawings. In order to identify more easily the discussion of any particular element or act, the most significant digit or digits in a reference number refer to the figure number in which that element is first introduced.

FIGS. 6-18 show aspects of iframes and elements, in accordance with various example embodiments.

DETAILED DESCRIPTION

Figure 1:
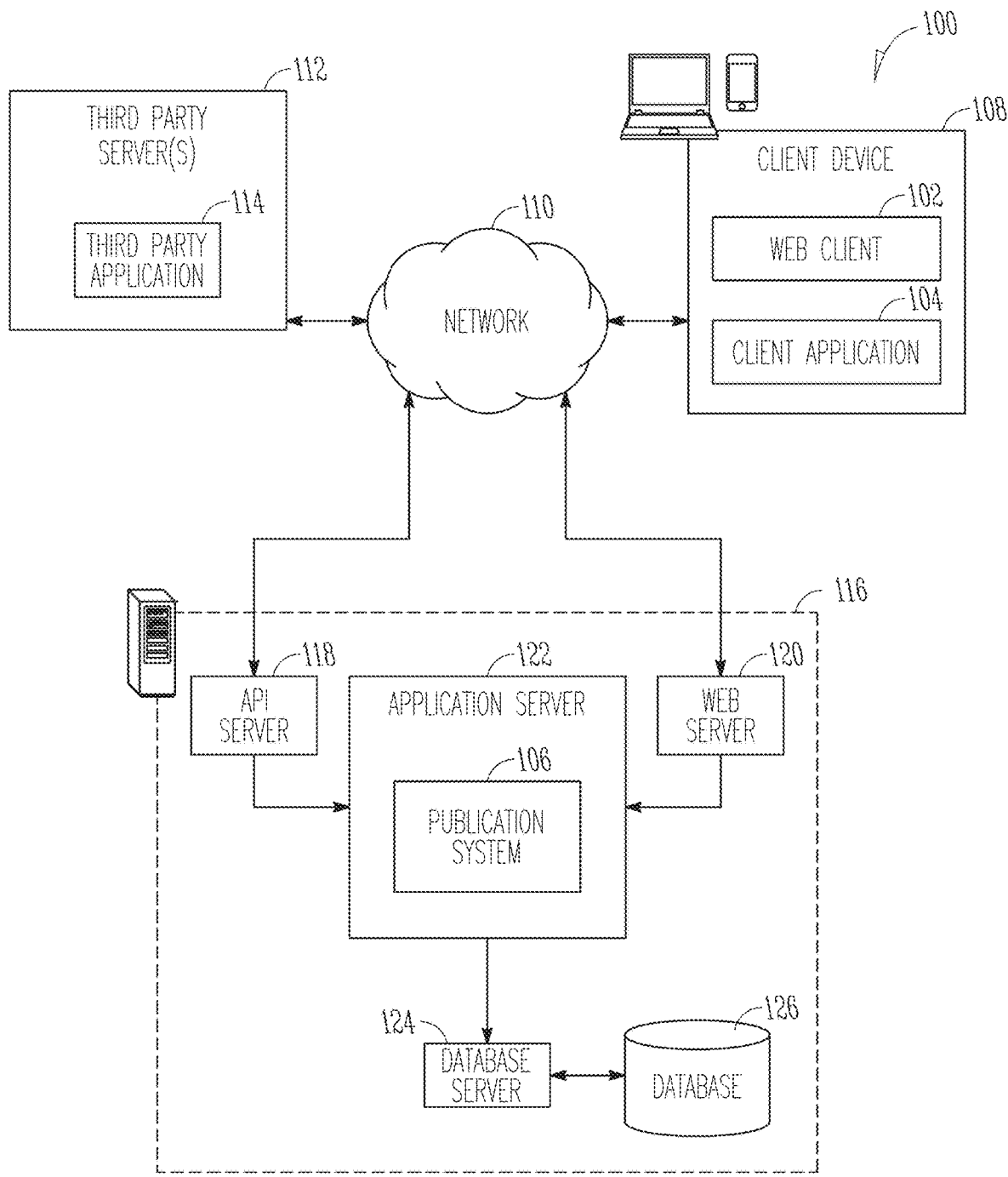
FIG. 1 is a block diagram illustrating a networked system, according to an example embodiment.

"Carrier Signal" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"Customer's Electronic Device" or "Electronic User Device" in this context refers to a client device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native app installed onto the customer's device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"Component" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service"

(SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device or other tangible media able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

In another context, a "Processor", also referred to herein as "processor (5400 in FIG. 5)," is a company (often a third party) appointed to handle payment card transactions (e.g., credit card, debit card). They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB® and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" in this context refers to a bank that offers card network or association branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code) while other information might not be (e.g., zip code). For example, when making payment via a credit card or debit card, the payment information includes primary account number (PAN) or credit card number, card validation code, expiration month, and year. In another payment example, for instance made using an Automated Clearinghouse (ACH) transaction, the payment information includes a bank routing number and an account number within that bank.

"Sensitive information" may not necessarily be related to payment information and may include other confidential personal information, such as medical (HIPAA) information, for example. The ambit of the term "Payment Information" includes "Sensitive Information" within its scope. In some examples, sensitive payment information may include "regulated payment information", which may change over time. For example, currently a merchant cannot collect more than the first six (6) or the last four (4) numbers of a customer's PAN without generally needing to comply with PCI regulations. But card lengths may change, and when they do the "6 and 4" rules will likely change with them. These potential future changes are incorporated within the ambit of "regulated payment information" which is in turn included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. The merchant (100) and merchant server (120) in some figures are associated with the merchant site. The merchant site is associated with a client-side (client side) application and a server-side (server side) application. In one example embodiment, the merchant site includes the Merchant Server (120 in FIG. 5), and the server-side application executes on the Merchant Server (120).

"Payment Processor" in this context (e.g. Payment Processor, 5300 in FIG. 5) refers to an entity or a plurality of entities that facilitate a transaction between a merchant site and a customer's electronic device. With reference to a high-level description illustrated in FIG. 5, in some examples described more fully below, the payment processor includes selected functionality of both Stripe (5300) and Processor (5400)/Card Networks (5500). For example, Stripe (5300) creates tokens and maintains and verifies publishable (non-secret) keys and secret keys. In the illustrated example, the Processor (5400)/Card Networks (5500) is involved in authorizing or validating payment information. In one example embodiment, Stripe (5300) and the Processor (5400)/Card Networks (5500) function together to authorize and validate payment information, issue a token, and settle any charges that are made. Accordingly, in this embodiment, the payment processor refers to the functionality of Stripe (5300) and the functionality of the Processor (5400)/Card Networks (5500). In another example embodiment wherein step (3) in the high-level description is not performed, and Stripe (5300) performs its own verification before issuing a token, the Processor (5400)/Card Networks (5500) are still used for settling any charges that are made, as described in step (7) in the high-level description. Accordingly, in this embodiment, the payment processor may refer only to the functionality of Stripe (50) with respect to issuing tokens. Further, in the example arrangement shown, Payment Processor (5300), Processor (5400), and the Card Networks (5500) are shown as separate entities. In some examples, their respective functions may be performed by two entities, or even just one entity, with the entities themselves being configured accordingly.

"Native Application" or "native app" in this context refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real time to run, and also differs from a Web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings form a part of this document: Copyright 2011-2017, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe", as an example of a payment processor)) that provides a number of functions and services to the application 104 that accesses the networked system 116. The application 104 also provides a number of interfaces described herein, which present output of the scheduling operations to a user of the client device 108.

The client device 108 enables a user to access and interact with the networked system 116, and ultimately the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on a third-party server(s) 112, is shown as having programmatic access to the networked system 116 via the programmatic interface provided by the Application Program Interface (API) server 118. For example, the third-party application 114, using information retrieved from the networked system 116, may support one or more features or functions on a website hosted by the third party.

Turning now specifically to the applications hosted by the client device 108, the web client 102 may access the various systems (e.g., publication system 106) via the web interface supported by the web server 120. Similarly, the application 104 (e.g., an "app" such as a Stripe, Inc. app) accesses the various services and functions provided by the publication system 106 via the programmatic interface provided by the Application Program Interface (API) server 118. The application 104 may be, for example, an "app" executing on a client device 108, such as an iOS or Android OS application to enable a user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
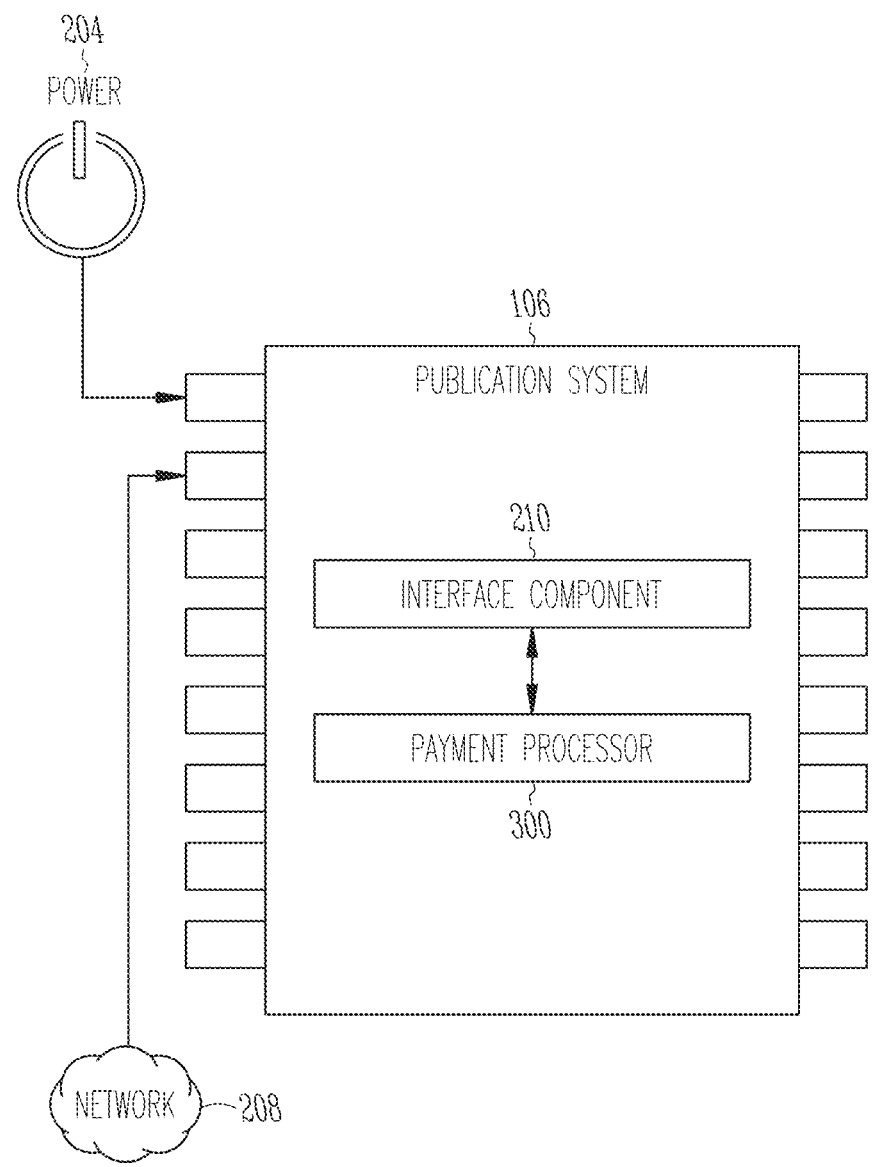
FIG. 2 is a block diagram showing the architectural aspects of a networked system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over the network 208) with other systems within the SaaS network architecture 100.

The interface component 210 is communicatively coupled to a payment processor 300 that operates to provide call center payment functionality in accordance with the methods described herein with reference to the accompanying drawings.

Figure 3:
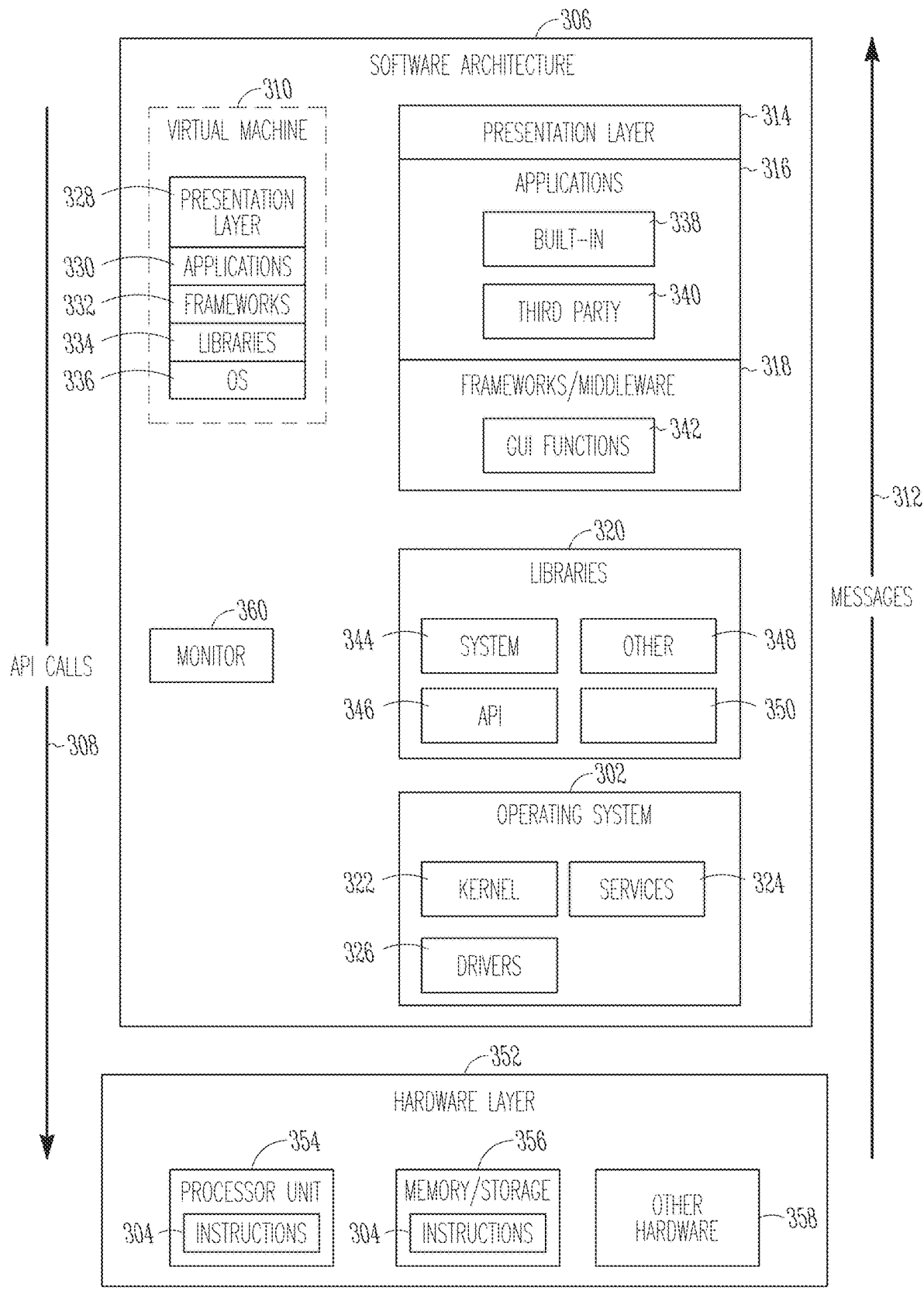
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. Executable instructions 304 represent the executable instructions of the software architecture 306, including implementation of the methods, components and so forth described herein. The hardware layer 352 also includes memory and/or storage modules as memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as messages 312 in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324 and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as operating system 302) to facilitate functionality described herein.

The applications 316 may use built-in operating system functions (e.g., kernel 322, services 324 and/or drivers 326), libraries 320, and frameworks/middleware 318 to create user interfaces to interact with users of the system. Alternatively, or additionally, in some systems, interactions with a user may occur through a presentation layer, such as presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system (OS) 336 in FIG. 3) and typically, although not always, has a virtual machine monitor 360, which manages the operation of the virtual machine 310 as well as the interface with the host operating system (i.e., operating system 302). A software architecture executes within the virtual machine 310 such as an operating system (OS) 336, libraries 334, frameworks 332, applications 330 and/or presentation layer 328. These layers of software architecture executing within the virtual machine 310 can be the same as corresponding layers previously described or may be different.

Figure 4:
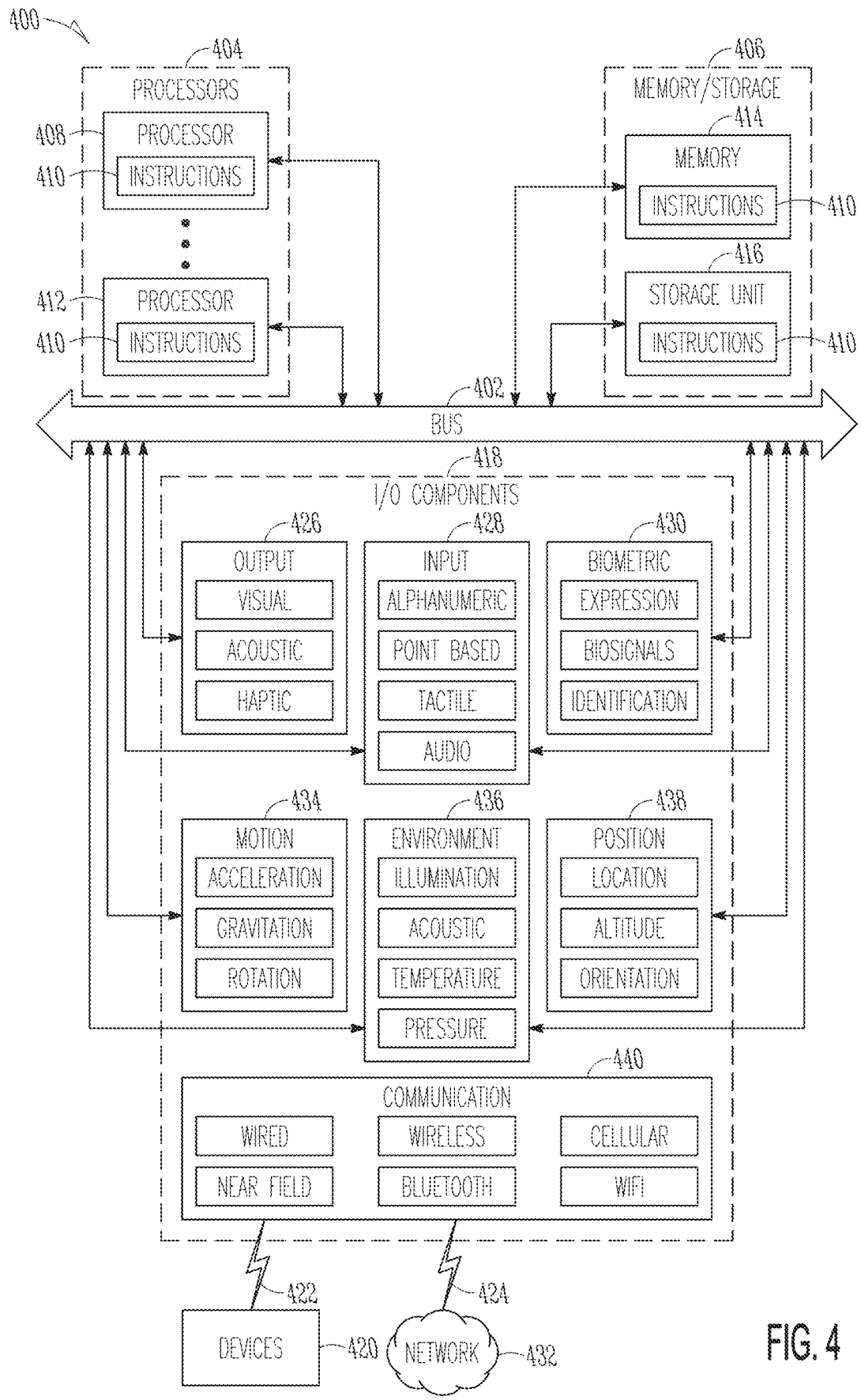
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via coupling 424 and coupling 422, respectively. For example, the communication components 440 may include a network interface component or other suitable device to interface with the network 432. In further examples, communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a Universal Serial Bus (USB)).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting a NFC beacon signal that may indicate a particular location, and so forth.

In some embodiments, a JavaScript library (such as Stripe.js) can be wired into a merchant's checkout form to handle credit card information. When a user signs up using the checkout form, it sends the credit card information directly from the user's browser to Stripe's servers. Stripe.js provides merchants with a set of technologies that can be easily and quickly integrated to securely accept payments online. With Stripe.js, merchants retain full control of their customers' payment flows, but their servers are never exposed to sensitive payment information.

When added to a merchant's payment form, Stripe.js automatically intercepts the payment form submission, sending payment information directly to Stripe and converting it to a Single-use Token. The Single-use Token can be safely passed to the merchant's systems and used later to charge customers. Merchants have complete control of their customers' payment experience without ever handling, processing, or storing sensitive payment information.

Figure 5:
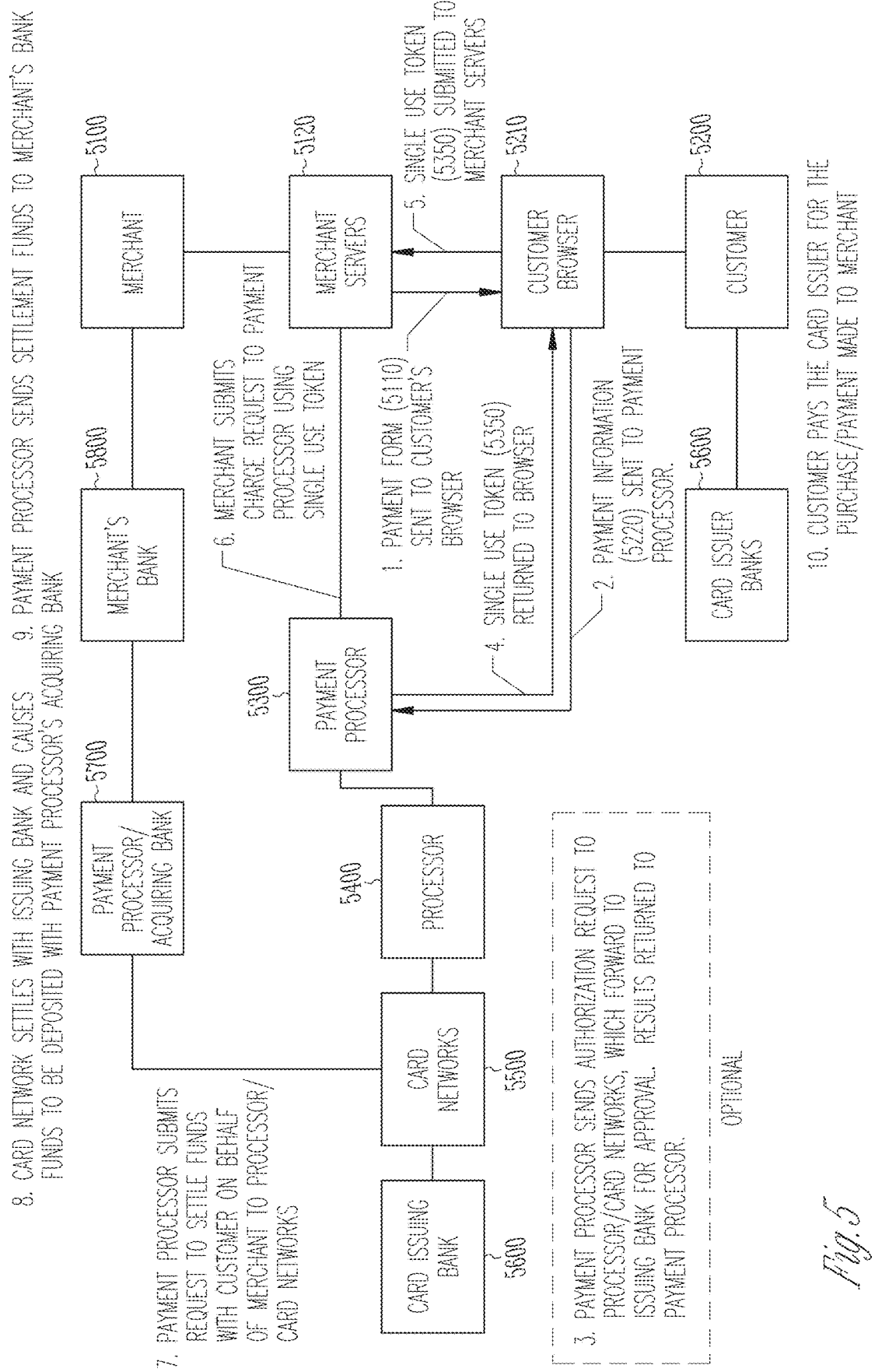
FIG. 5 is a block diagram showing aspects of an online method for conducting a transaction between a merchant site and an electronic user device using a payment processor, according to an example embodiment.

Viewed broadly in one example, and with reference to FIG. 5, Stripe.js works as follows:

1. The Merchant's Customer (5200) uses an internet-enabled browser (5210) to visit the Merchant's site. Customer is served a Stripe.js enabled Payment Form (5110) using standard web technologies. The Customer (5200) enters the specified information including their Payment Information (5220) and submits the Payment Form (5110). The Billing Info portion of the Payment Form (5110) is for payment via a credit card or debit card. If payment is to be made via an Automated Clearinghouse (ACH) transaction, the Billing Info portion of the Payment Form (5110) will request a bank routing number and an account number within that bank, and possibly additional information, such as the bank name and whether the account is a checking or savings account.

2. The Customer's payment information (5220) is sent from the Customer's browser (5210) to Stripe (5300), never touching the Merchant's Servers (5120). In this manner, the client-side application electronically sends payment information retrieved from the customer's electronic device to the payment processor. The client-side application does not send the payment information (5220) to the server-side application.

3. In one preferred embodiment, Stripe (5300) submits the relevant transaction to a Processor (5400) or directly to the Card Network (5500) for authorization or validation of the payment information. The Card Network (5500) sends the request to the Card Issuing Bank (5600), which authorizes the transaction. In this embodiment, Stripe (5300) and Processor (5400)/Card Network (5500) function together as a payment processor. In another example embodiment, this step is performed without any communication to the Processor (5400)/Card Network (5500). Instead, Stripe (5300) performs its own authorization or validation of the payment information using heuristic means, such as by checking the Bank Identification Number (BIN), also referred to as the Issuer Identification Number (IIN), against a database of known, valid BINS that is on file with Stripe (5300). (The BIN is a part of the bank card number, namely the first six digits.) In yet another example embodiment, this step is not performed at all since the authorization or validation is not necessary for the next step (4) to succeed. That is, it is acceptable to create a Single-use Token in step (4) that represents payment information which has not been validated in any way.

4. If authorized, Stripe (5300) will generate and return a secure, Single-use Token (5350) to the Customer's Browser (5210) that represents the customer's payment information (220) but doesn't leak any sensitive information. In the example embodiment wherein step (3) is not performed, Stripe (5300) performs this step without waiting to receive authorization from the Processor (5400) or the Card Network (5500). In this manner, the payment processor (here, Stripe (5300)) creates the Token (5350) from the payment information sent by the client-side application, wherein the Token (5350) functions as a proxy for the payment information (5220).

5. The Payment Form (5110) is submitted to Merchant Servers (5120), including the Single-use Token (5350). More specifically, the payment processor sends the Token (5350) to the client-side application, which, in turn, sends the Token (5350) to the server-side application for use by the server-side application in conducting the transaction.

6. The Merchant (5100) uses the Single-use Token (5350) to submit a charge request to Stripe (5300) (or to create a Customer object for later use). In this step, Stripe (5300) submits a request to authorize the charge to the Processor (5400) or directly to the Card Network (5500). This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (so-called "card on file" scenario). Using the process described in steps (1) through (6), the payment information can be used by the server-side application via the Token (5350) without the server-side application being exposed to the payment information.

7. Stripe (5300) settles the charge on behalf of the Merchant (5100) with the Processor (5400) or directly with the Card Network (5500).

8. The Card Network (5500) causes the funds to be paid by the Card Issuing Bank (5600) to Stripe (5300) or to Stripe's Acquiring Bank (5700).

9. Stripe (5300) causes the settled funds to be sent to the Merchant (100) (or to the Merchant's Bank (5800)), net of any applicable fees.

10. The Card Issuing Bank (5600) collects the paid funds from the Customer (5200).

Not all of the steps listed above need happen in real time. Other examples, arrangements and functionality are possible. Applicant's published patent application US 2013/0117185 A1 is incorporated by reference in its entirety in this regard. Typically, when the Merchant's Customer submits the payment form in step (1), steps (1) through (6) happen in real time and steps (7) through (10) happen later, usually once per day, as a batch process settling all of the funds for all of Stripe's merchants. In some examples, the payment processor uses an http-based tokenization API for use in steps (2) and (4) above. Some broader examples may be considered as "tokenization as a service" in which any data is tokenized. One general example may facilitate a merger and acquisition (M&A) analysis in which companies want to compare an overlap in their customer base with another. A payment processor (acting as a tokenization service) can tokenize the customers of each company and compare the overlap without revealing confidential information to either party. Unique payment tokens can be adapted to enable and facilitate such a tokenization service.

As mentioned above, the present disclosure seeks to address certain technical problems existing in conventional payment processors and methods.

In some embodiments, these problems are addressed through the provision of configurable data entry elements. A data entry element may also be termed an "element" herein. Some examples may be known as configurable data entry elements, or in some examples, as "Stripe" elements. Generally speaking, elements are pre-built user interface (UI) components which can be embedded into a merchant webpage to allow merchants to collect securely payment details on their web site. In one example, a single-line "card" element is made up of four individual fields (which could each be elements as well) and include respectively a card number field, an expiration date field, a CVC field, and a billing postal code field.

Referring now to FIG. 6, an element 600 presented in a web or app page includes an iframe 602. The element 600 is shown in the display of a smart phone, for example. The iframe 602 has a payment data entry element 604 for the entry of payment data (such as a credit card number and expiry date), as well as other user interface fields or action messages such as "Use an Existing Payment method" 606, "Add a New Payment Method" 614, "Done" 608, and "Please confirm recipient details—Michelle Bu" 610. A virtual key pad 612 is visible lower down in the display. The key pad 612 can be used to enter payment data into the payment data entry element 604.

Figure 7:
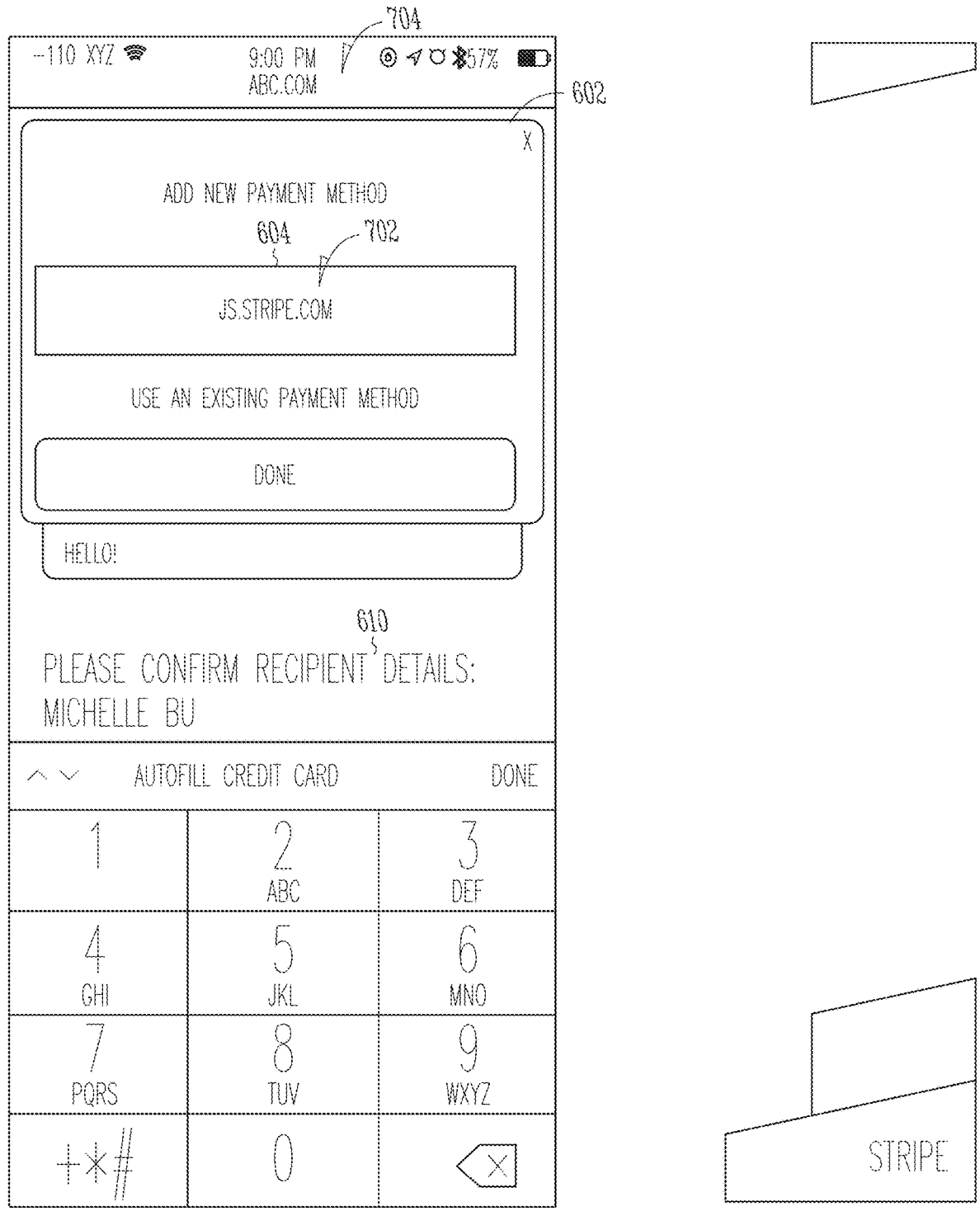

In some examples, the iframe 602 is a separate, isolated HTML document, hosted at a payment processor server, for example at js.stripe.com as shown at 702 in FIG. 7. In some examples, an iframe 602 is constituted by, or includes, a secure, embedded web page that is hosted on a payment processor server. In some examples, an iframe is constituted by or includes a functional equivalent to the specific examples discussed herein.

An example server address is shown at 702 in payment data entry element 604 to indicate that this field points to the Stripe server even though it is embedded in the web page of a merchant, in this case Lyft at lyft.com shown at location 704. Any payment data entered by a customer into payment data entry element 604 is directed to the payment processor (e.g., Stripe), not to the merchant hosting the webpage (e.g., Lyft). The merchant does not get access to this data or regulated data associated with it. The merchant is thus kept free of the need to comply with (PCI) requirements and associated technical burdens discussed further above.

In one aspect, the use by a payment processor of elements 600 provides the payment processor with more flexibility and greater degree of control to inject convenient payment functionality and enhance user experience remotely. The payment processor can build UI's that do not require a merchant to run extensive encryption software such as jquery.payment, or other programs. In this regard, two alternate examples of visually appealing elements 800 and 802 are shown in FIG. 8. While each element 800, 802 may include an iframe and have the same data entry elements. These fields can be colored and configured for presentation in different ways at the control of the payment processor, without the need for the merchant to intervene.

The use of elements of the type described herein also reduces integration complexity. Conventionally, not only does a merchant need to be concerned about stripping card details from payment form submissions, it also has to source or build very extensive code around tasks such as validation and formatting when deploying a conventional checkout and payment system. This complexity is not required in the present disclosure. In one example, a merchant merely integrates a configured iframe into a web page.

Figure 9:
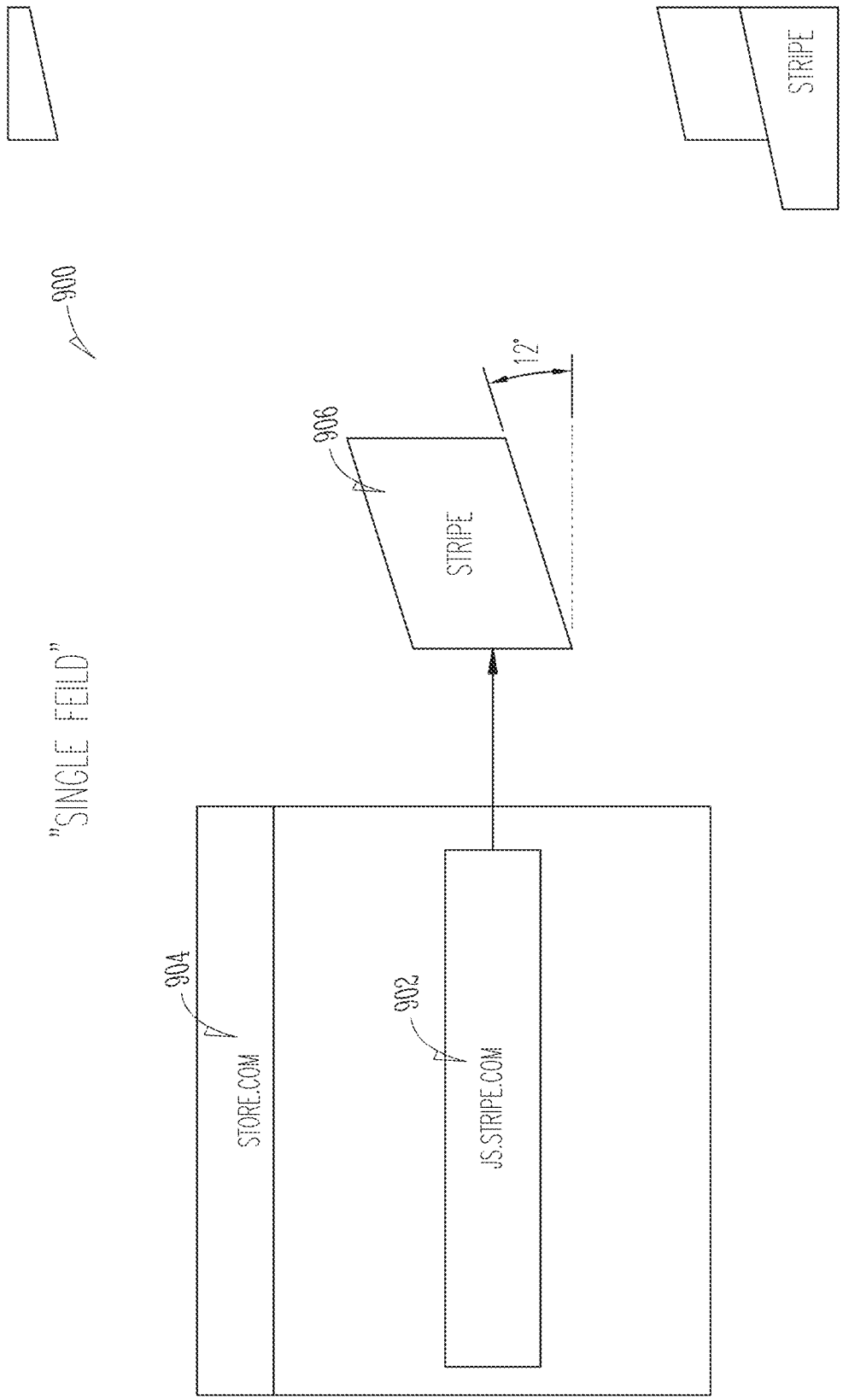

Further examples of the implementation and use of elements can be modeled with reference to FIG. 9. In the illustrated "single field" arrangement 900, a payment processor element 902 (e.g., hosted at js.stripe.com) is embedded within a merchant page 904 (e.g., hosted at store.com) and communicates via APIs to the server of the payment processor 906 (e.g., Stripe) directly. By using this model, (PCI) regulators can be assured that the merchant (store, or other party) cannot access card numbers and regulated information. The iframe is protected from Javascript on the outside due to a so-called "same origin" policy. In computing, the same-origin policy is an important concept in the web application security model. Under the policy, a web browser permits scripts contained in a first web page to access data in a second web page, but only if both web pages have the same origin. The merchant whitelists js.stripe.com (in this example) in their content security policy, and the payment processor handles the rest. By whitelisting js.stripe.com, a merchant entrusts a payment processor not to be a bad actor, but the payment processor is itself regulated by (PCI) requirements, which relieves the merchant of this burden. In one example, the manner in which the payment processor element 902 communicates between its own page and the merchant page 904 is via an API called postMessage that is exempt from the same origin policy. The payment processor can notify the merchant that certain user actions were taken, for example, that a user input was focused (see below regarding autofill), or that a token was created, and so forth.

Figure 10:
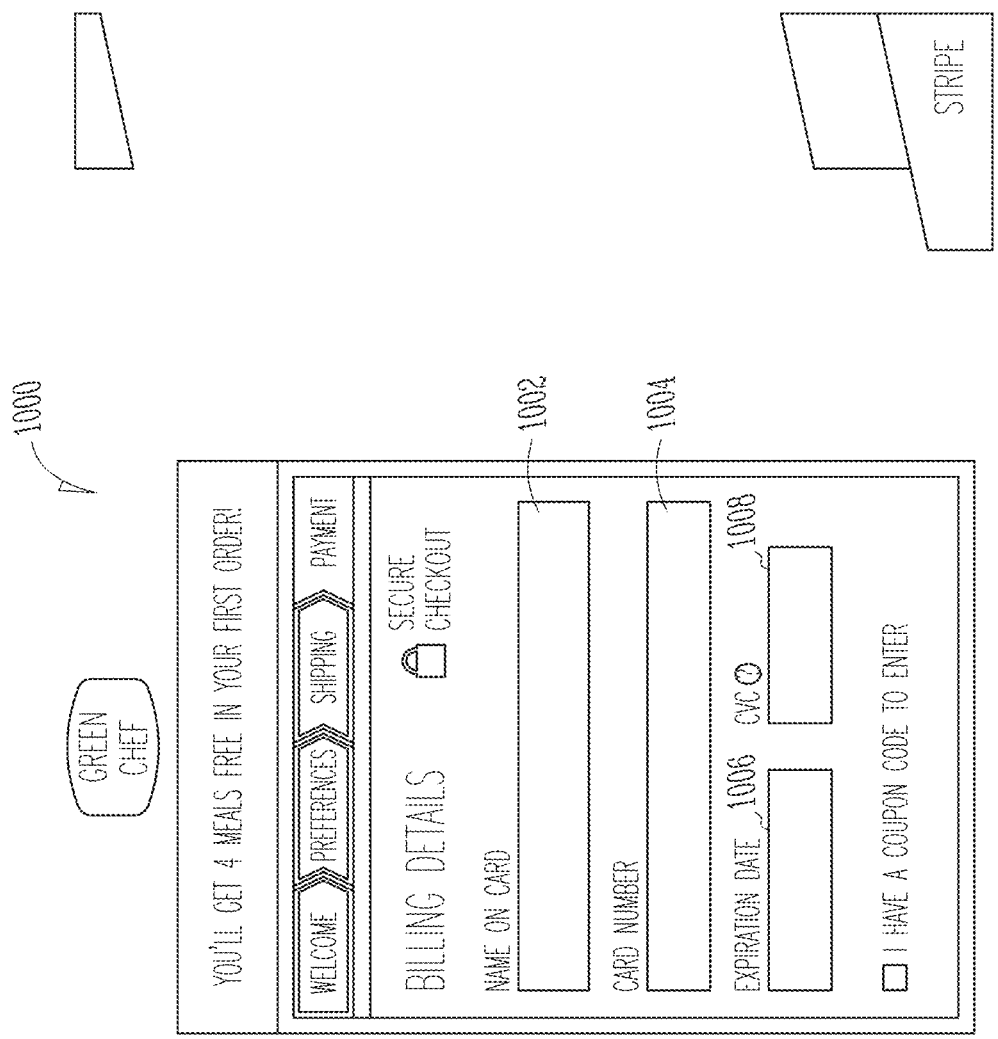
Figure 11:
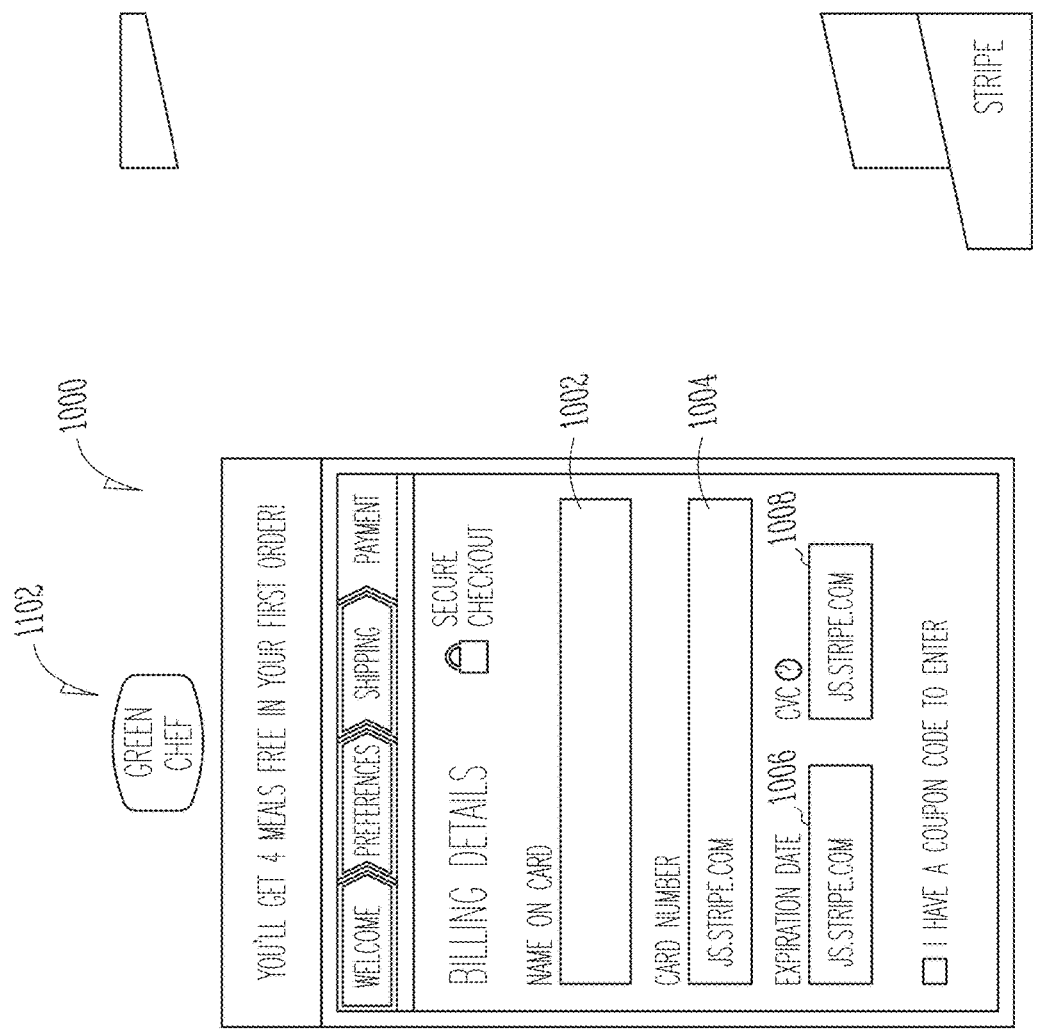
Figure 12:
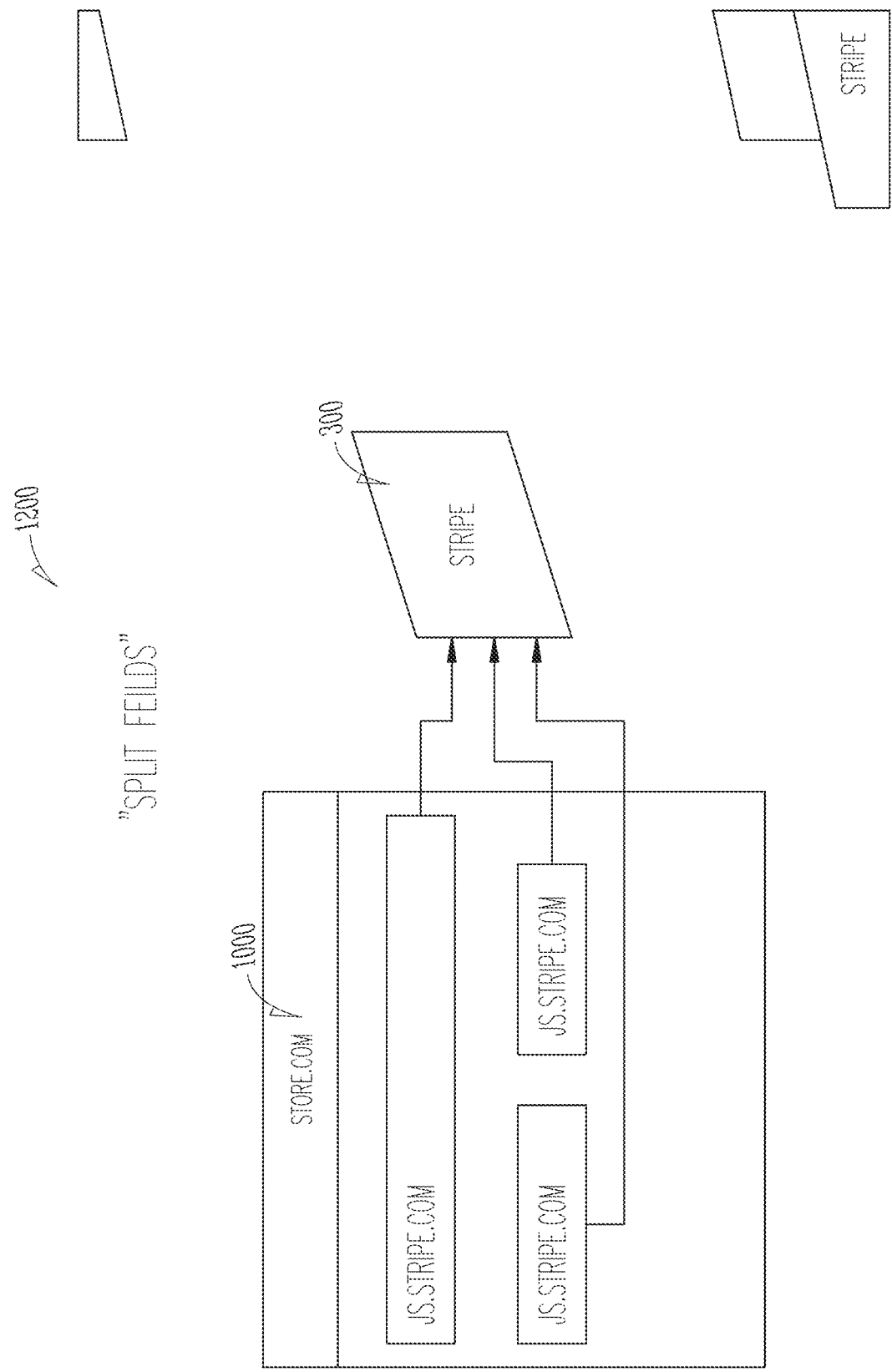

Further examples of iframes and elements are now described. With reference to FIG. 10, an element 1000 with four data entry elements will be seen. These fields include "Name on Card" 1002, "Card Number" 1004, "Expiration Date" 1006, and "CVC" 1008. It is not visibly or immediately apparent which of these displayed HTML elements are iframes, but with reference to the same view in FIG. 11, it will be seen that three of these four input fields (1004, 1006, and 1008) include "invisible" iframes and are configured to direct data entered into these fields away from the element 1000 (in this case hosted by Green Chef as denoted at 1102) to js.stripe.com pages hosted by a remote payment processor (in this case Stripe). These fields are called split fields and can be modeled in one example as shown by the "split fields" model 1200 in FIG. 12. In one example, each field may communicate individually and directly with a payment processor, such as Stripe 300. In another example, this three-channel arrangement can be rendered more efficient by introducing another type of iframe called a "controller".

Figure 13:
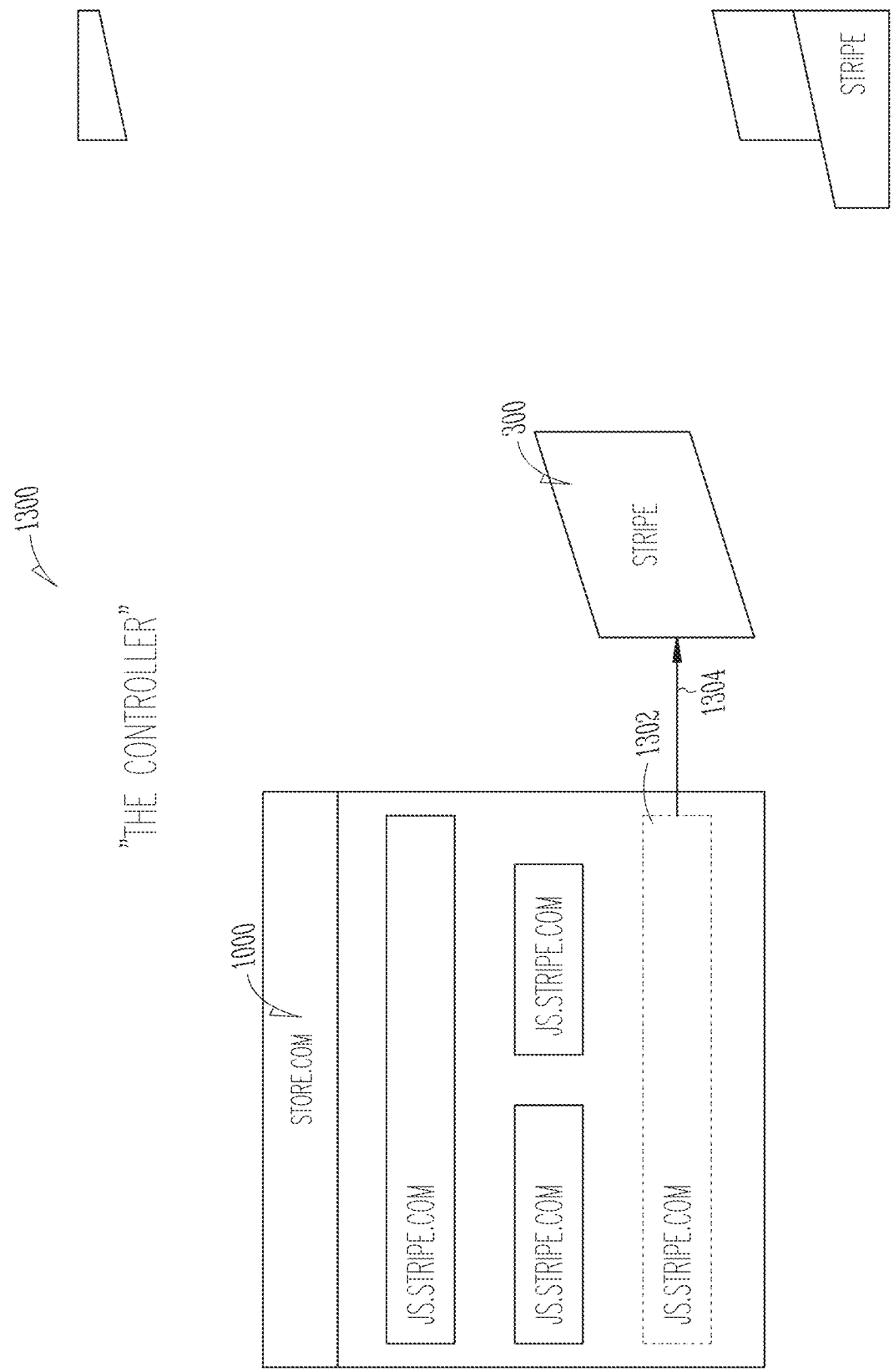
Figure 14:
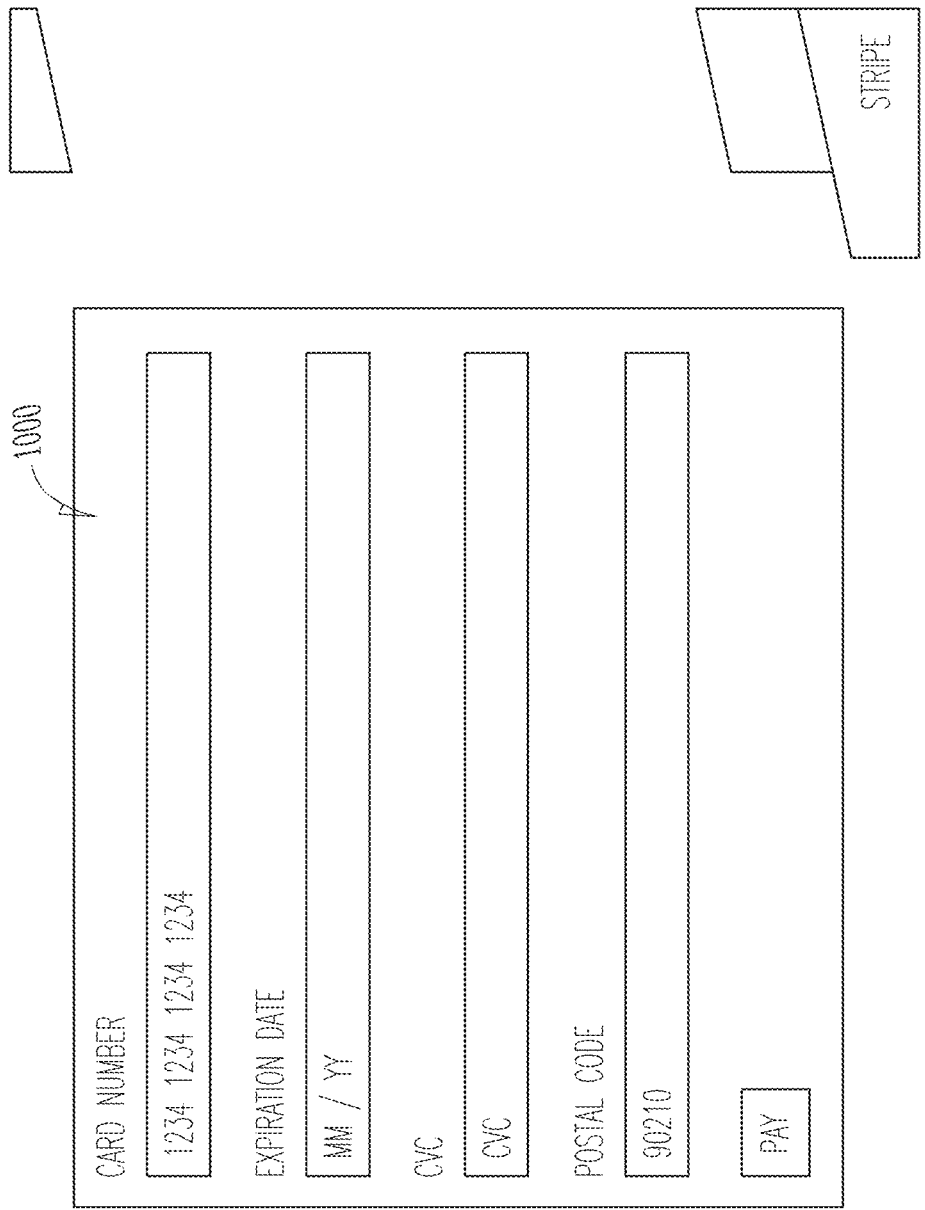

Thus, with reference to FIG. 13, a controller model 1300 is shown. A controller iframe shown in dotted outline is associated with data entry element 1302. The controller iframe allows aggregation or coordination of state or content across all elements or fields on the page (or within element 1000) and communicates at 1304 this aggregated state or content to the payment processor 300. With reference to FIG. 14, a controller iframe can also synchronize state or content across all the elements on a page, which includes an element such as element 1000 shown in the view. The data entry elements on the illustrated page can be used to collect payment information from an online customer of a merchant, without the (PCI) regulated part of the payment information being communicated or rendered accessible to the merchant. The ability of a controller iframe to synchronize state or content across all fields on a page allows a browser hosted by a server at the payment processor to autofill information across, and not just within, the fields within an element 1000. Further examples in this regard are discussed further below.

Figure 15:
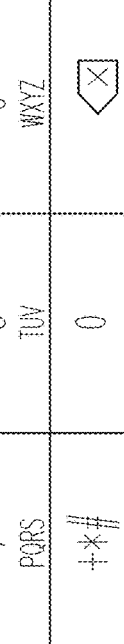
Figure 16:
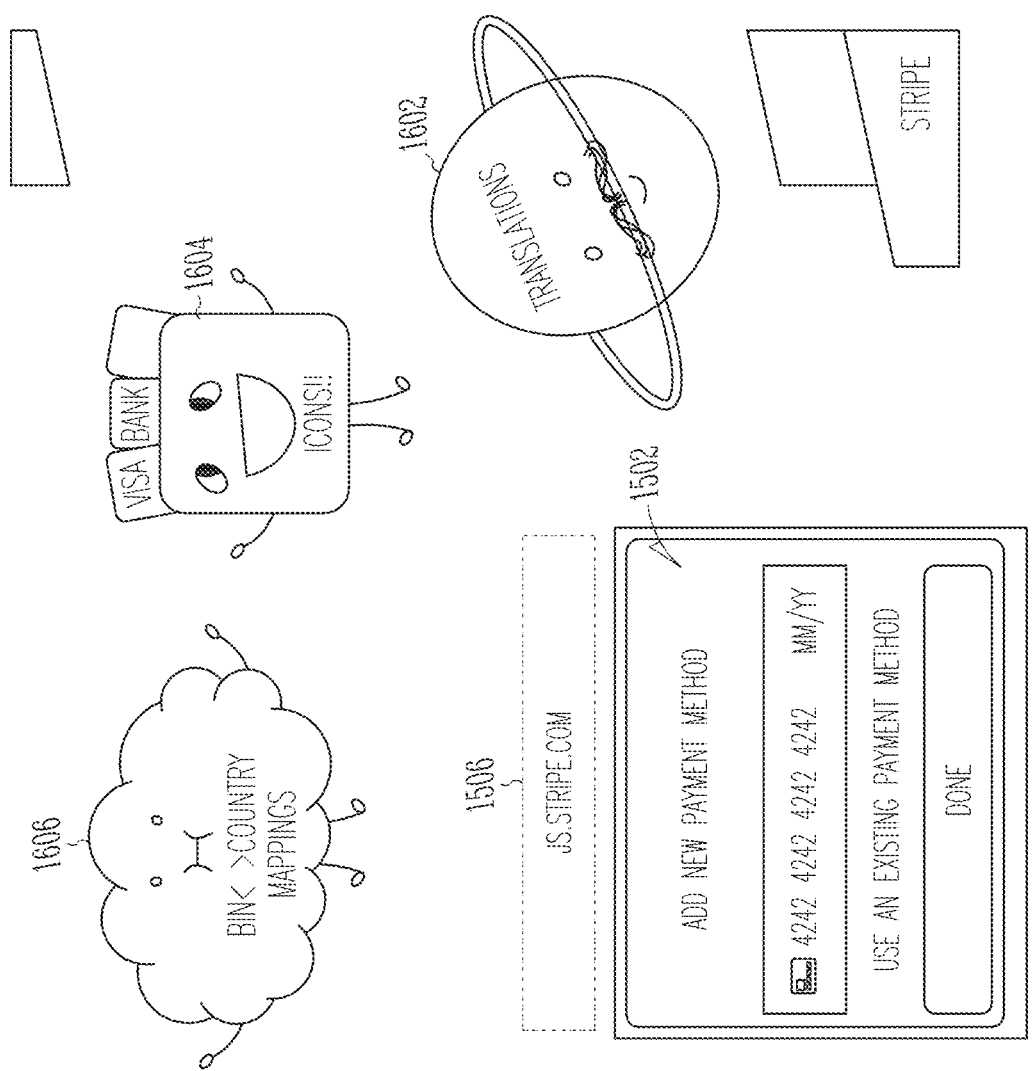
Figure 17:
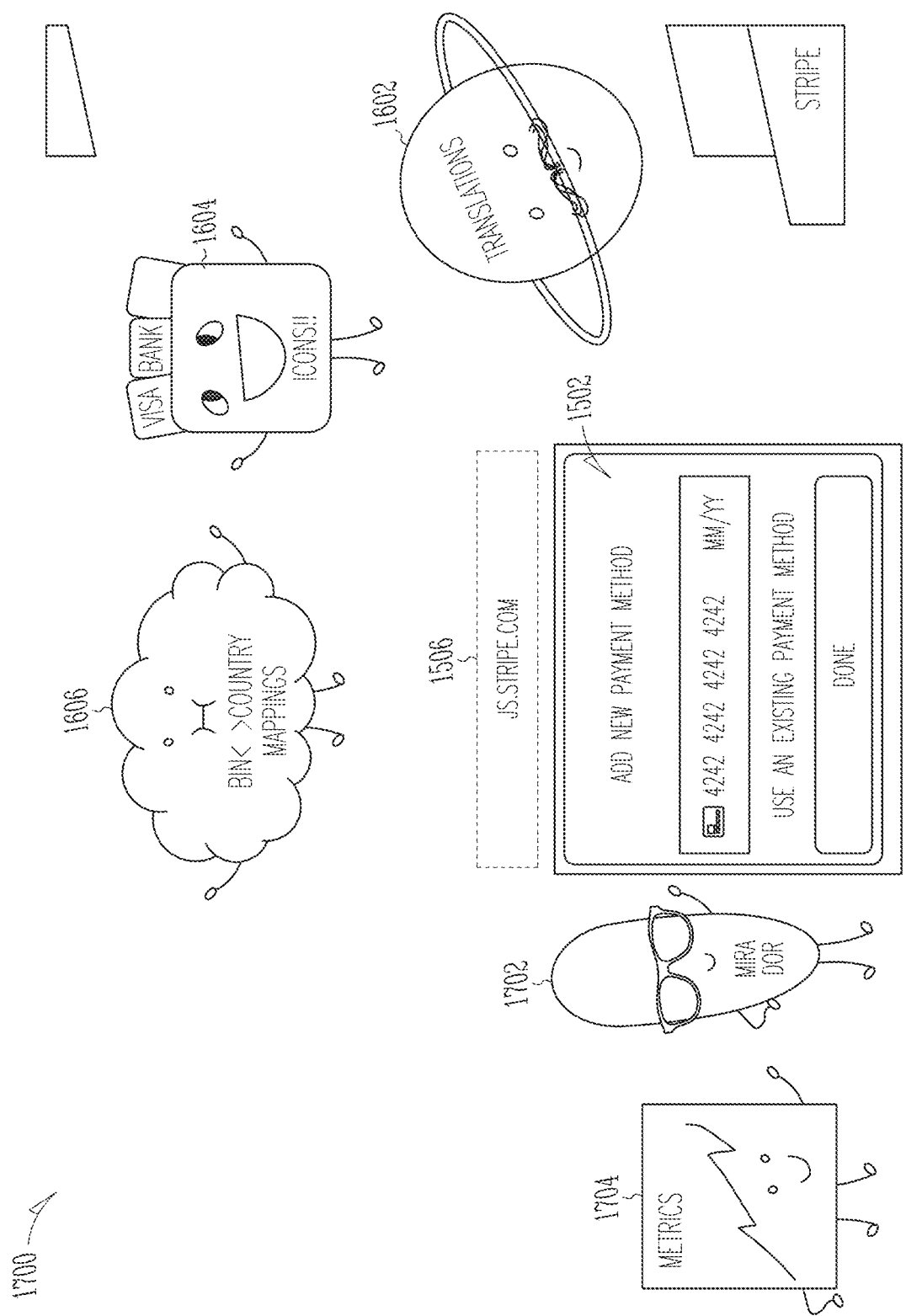

A hidden controller iframe can be embedded in an element or web page. Two example page elements 1502 and 1504 that each include a hidden controller iframe are shown in FIG. 15. The invisible controller iframe can be deployed in different parts of the page, as shown at 1506 and 1508, respectively for example. Further, with reference to FIG. 16, the hidden controller iframes 1506 and 1508 can also be used to pre-fetch so-called "expensive assets" (or data-rich objects). As the hidden controller iframe 1506 is in direct communication with the payment processor, expensive assets such as translations 1602, icons and graphics 1604, and BIN< >country mappings 1606 can be pre-fetched before any of the objects are mounted for display on the page element 1502. Still further, with reference to FIG. 17, a hidden controller iframe can also be used to communicate with a metrics backend system 1704 to perform operations such as A/B testing, such as testing user views and the loading time of images, e.g., Mirador 1702, and so forth. Some examples include measuring so-called "conversion rates", for example the rate at which browsing by a user "converts" into an actual purchase, which can be detected and measured by the aggregation of data entered into other fields of the page element 1502 and transmitted to the linked payment processor as described above.

Figure 18:
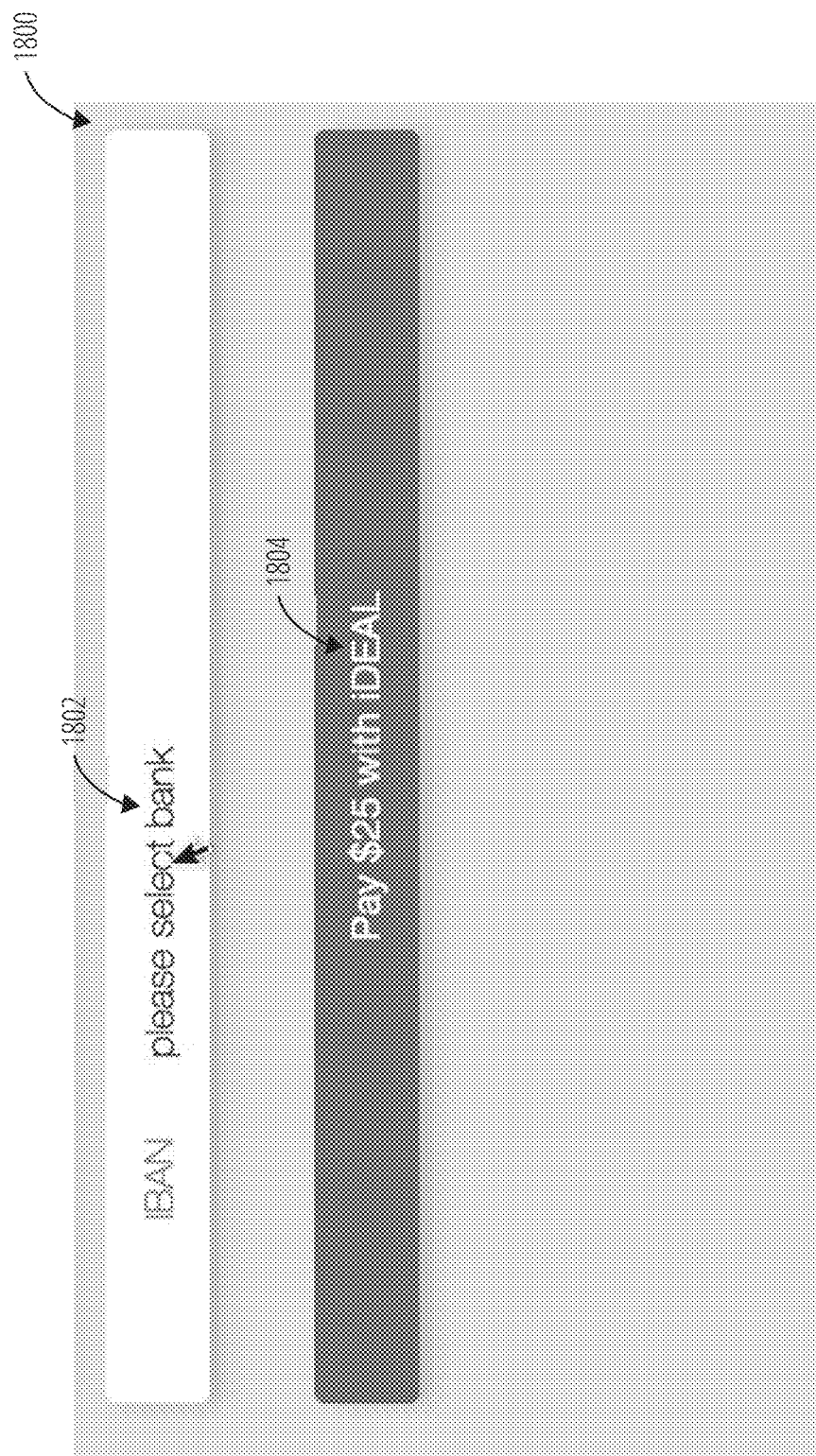

With reference to FIG. 18, other configurable aspects of an element according to the present disclosure include aspects such as shape, height, width and aspect ratio of the displayed data entry elements and iframes. Other configurable aspects are possible, including dynamically configurable features as described further below. Multiple iframes may be combined to provide combined functionality in a single page 1800, for example as shown by the relatively wide, broad, and independently functional elements 1802 "please select bank" and 1804 "Pay $25 with iDeal". Different payment options can be offered thereby. An iframe can include drop down choices for payment based on detected card numbers, issuing countries, and other information. Examples include "Pay by IDEAL" in the Netherlands, "Pay by SOFORT" in Germany, and "Pay by PayPal" in the United States and other countries. So some elements are globally configurable.

Figure 19:
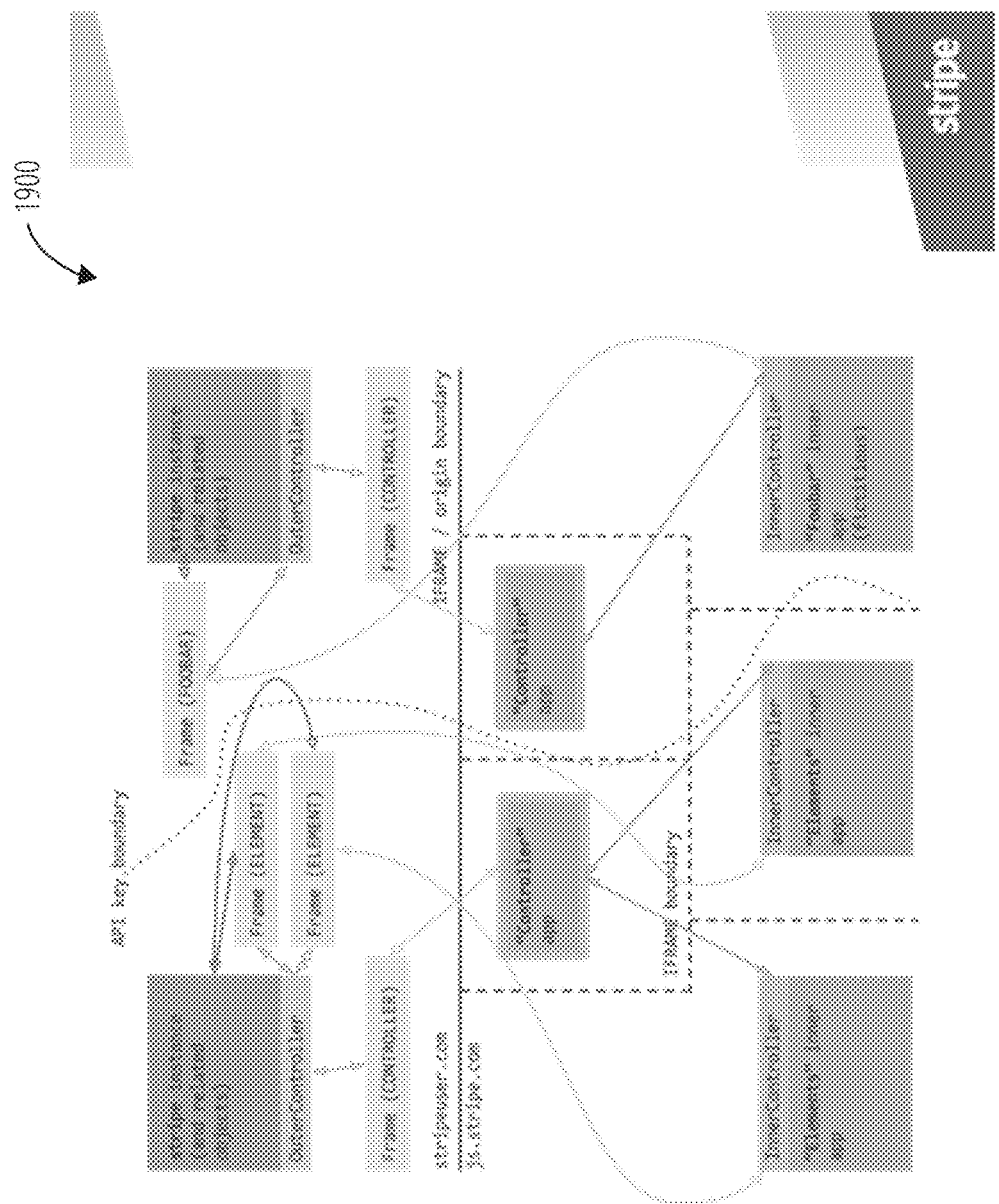
FIG. 19 is a block diagram illustrating example types of code that may be associated with different iframes deployed visibly or invisibly on an example webpage, in order to effect some of the example embodiments described herein.

FIG. 19 is a block diagram illustrating the types of code that may be associated with different iframes deployed visibly or invisibly on an example page 1900 in order to deploy the example elements described herein. Other coding examples are possible.

As discussed above, merchants can incorporate such elements into their own customized web pages (UI's), so there is often a need for an element to be provided in a wide variety of different container sizes and font styles. Conventional attempts to adjust the width of an input field have included making rough estimates to decide whether or not there is enough display space in an "average" monitor to keep some fields expanded. This can result in a number of issues: making a lot of space for all of the inputs to account for the widest possible font and the widest possible input; with smaller fonts, the spacing often looks awkward; hiding the card number input even when there is enough room to leave it expanded; and even though extra space is provided, for some large fonts, the fields still fail to be wide enough. Depending on this stylistic variability, as well as the real-time state or content of an end user's interaction with an element, and further in view of the varying degree of card information needed in various countries, the configuration of the present page elements may vary widely.

In some examples of the present disclosure, different data entry elements within iframes are shown or hidden (or sometimes partially hidden) at different times within the configurable element. Consider again the single line iframe discussed further above. It includes four data entry elements in a single line for capturing payment information. In one related example of this type, a field for entry of a postal code is not presented at all unless the payment processor detects that the end user's card is from a country where postal code verification is actually required. In this way, the inadvertent submission of protected information regulated, for example, by (PCI) requirements can be minimized, or prevented altogether, as the "sensitive" fields are withheld until it can be verified they are needed through information entered into another non-sensitive field.

In a further example, the width of each date entry element or field within a given iframe or element is calculated and adjusted dynamically based on the actual font entered by a user in real time, while in some cases assessing at the same time a widest possible input that a field size would need to be to contain a known data entry format (e.g., a postal code having five digits) using that particular font. This "widest possible input" value is also updated dynamically, depending on the state or content of the data entry element, or for example the screen size of a client device within which the data entry element is to be displayed. For example, GB postal codes are far longer than 5-digit US postal codes and that information is used to update the "widest possible input" value. This approach leads to better use of available display space, prevents bugs in using large fonts and long text, and in some examples, warns a merchant seeking to deploy such an element that a field width they may seek to designate for the element will be insufficient for certain fonts.

In some cases, the design criteria for a merchant webpage may conflict with each other. For example, in order to comply with certain (PCI) regulations, a merchant should not receive credit card numbers, related expiry dates, and CVC details. A merchant can, however, receive postal code details. One way to address this situation is to embed an iframe into the merchant's website to capture the restricted information, without intervention by the merchant, and pass it directly to a payment processor. Many streams of data can be sent to a payment processor (and interactive configuration achieved) if many iframes are used in one page. But these several streams can cause bandwidth issues on the channel of communication between the merchant's server and the payment processor's server. This bandwidth problem can in some examples be addressed by embedding a visible or hidden controller iframe within the merchant's webpage. As described herein, a single iframe can control and aggregate data entered, for example, into the four data entry elements of a single line element and send one stream of information to the payment processor and significantly increase efficiency. Even so, notwithstanding the use of this enhanced functionality, a merchant webpage designer is still confronted with the problem of how to present a user-friendly and aesthetically pleasing page that still retains full (PCI) compliant functionality.

Here, a variant of the controller iframe can be deployed to dynamically adjust the widths of data entry elements in a webpage. Assume a user (e.g. a merchant's customer) wishes to enter payment information into a webpage having an embedded "card" element comprising four fields for capturing, respectively, a card number, an expiration date, a CVC number, and a billing postal code. In one example, a controller iframe embedded in the page detects an issuing country of the card based on the known identity of some of the card numbers being entered by the user. The identity of the country may be given by the first four numbers of the card and thus may be quickly detectable after only a few initial key strokes. Other sections of the card number may also relate to this or other aspects.

Now that the issuing country has been identified, and its payment regulations known, several choices for dynamic field width selection are now possible. The detected issuing country may not require a billing postal code for authorization. In this case, the controlling iframe does not execute code to show this field in the webpage element. The displayed element is thus presented in an abbreviated form, without excessive length, and without unnecessary data entry elements. Available display space on the user's device is not used up unnecessarily, and unnecessary information is not captured. Alternatively, the issuing country may require, for example, a four-digit postal code for authorization. In this example, the controller iframe dynamically includes in the single line element a four-digit postal code field for capture of the appropriate data in the required form. The same concept may be applied for five-digit postal codes, and so forth, as well as applied to other types of data and formats.

The dynamic width concept can be applied the other way around. For example, if the controller iframe detects that a large amount of information being entered into a data entry element will cause the field (or other portions of the element) to be pushed out of view from a user's screen, the width of a prior-completed field in the element is reduced to keep the active field in view. Some of the information entered into the prior-filled field may be truncated accordingly. The truncation may be dynamic based on the dynamic adjustment of the width of the active element.

In the above dynamic examples, the payment processor (for example, Stripe 300) is still in control of what is shown in the fields, their format, the data that is entered into them, and how the fields communicate with the payment processor. The merchant does not (and cannot) become exposed to this data, while at the same time the payment processor can handle material parts of the user's payment experience.

Reference is now made to FIG. 20 for further detail of a dynamic width example. The figure shows sequential views of a payment element 2000 embedded in a merchant's webpage (not shown). In this example, the element 2000 can capture four aspects of a user's credit card and related details to effect an example payment of $25, which can be activated by button 2002 when the payment details are complete. The four card aspects are card number, card expiry date, card CVC number, and billing postal code. Each aspect can be captured by a respective data entry element in the element 2000, and each field has an associated iframe. The four associated iframes are controlled by a controller iframe (not visible to a user) in the manner described herein.

Figure 20A:
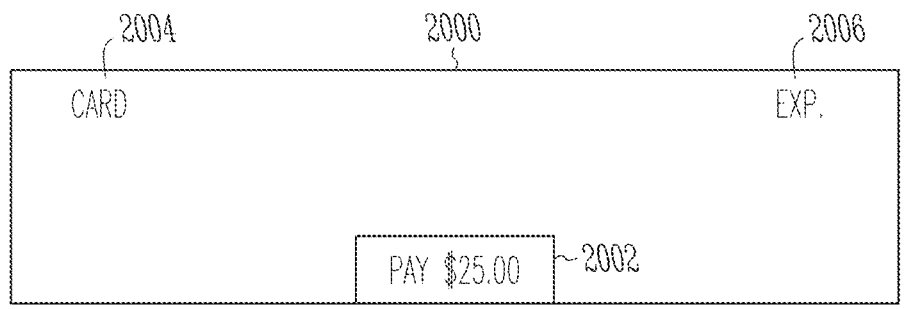
FIGS. 20A-20F show sequential views of a payment element 2000 embedded in a merchant's webpage, according to some example embodiments.

Initially, as shown FIG. 20A, only two data entry elements are visible: card number field 2004 and expiry field 2006. The overall width of the element 2000 is fixed, which allows convenient and steady placement of it in a merchant's webpage. The width of the expiry field 2006 is fixed, but the width of the card number field 2004 is dynamic.

Figure 20B:
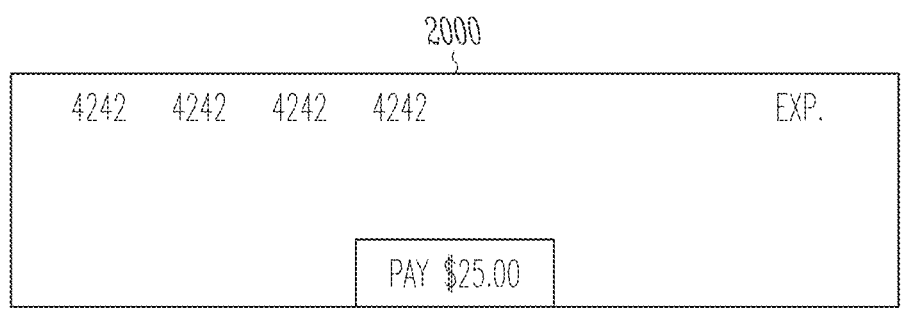
Figure 20C:
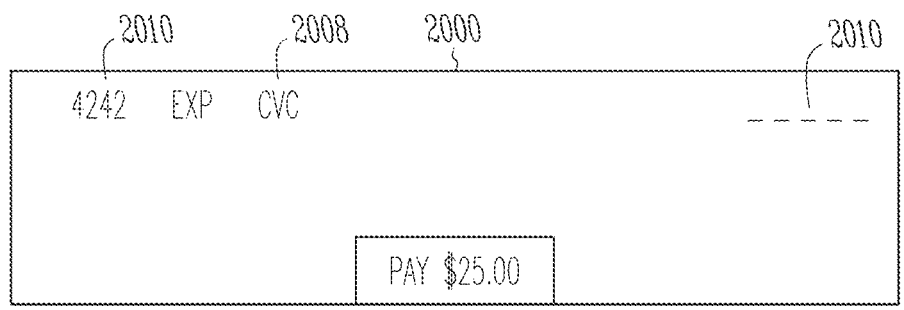
Figure 20D:
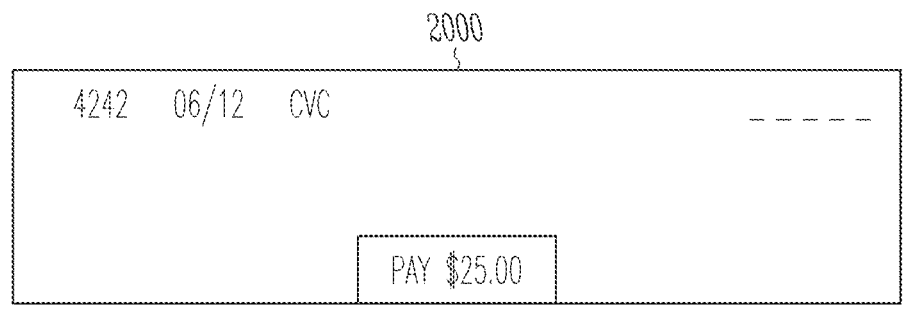
Figure 20E:
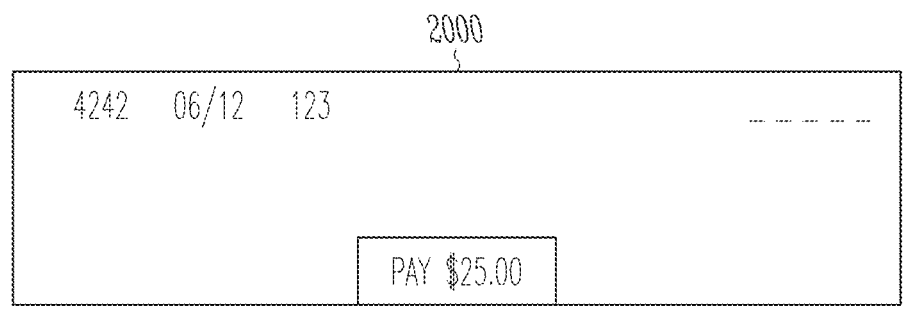
Figure 20F:
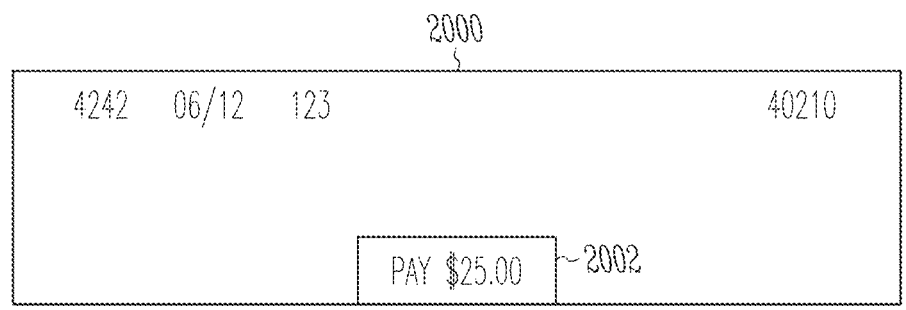

In FIG. 20B, a user enters a card number (for example, 4242 4242 4242 4242) in the card number field 2004, which at this point is at full width. In this example, the card number is indicative of an issuing country requiring a postal code for payment authorization, and this is detected by the controller iframe, which is in communication with the payment processor. Based on this country detection, the width of the card number field 2004 shrinks as shown in FIG. 20C to allow entry from the right of a CVC 2008 and postal code 2010 fields. The overall width of the element 2000 remains fixed. Only the last 4 digits of the credit card remain visible at 2012. Salient details regarding CVC and postal card are entered by the user in the ensuing views, and payment effected by clicking button 2002 in FIG. 20F.

If the credit card number indicates a country that does not require a postal code for payment authorization, display of the postal code field is withheld. The extent of the width adjustment of the card number field 2004 (or other field) is smaller. An element of the present subject matter is thus highly configurable in content and appearance, and it has the technical capability to provide (PCI) compliance for a merchant in highly adaptive and accommodating manner.

Figure 21:
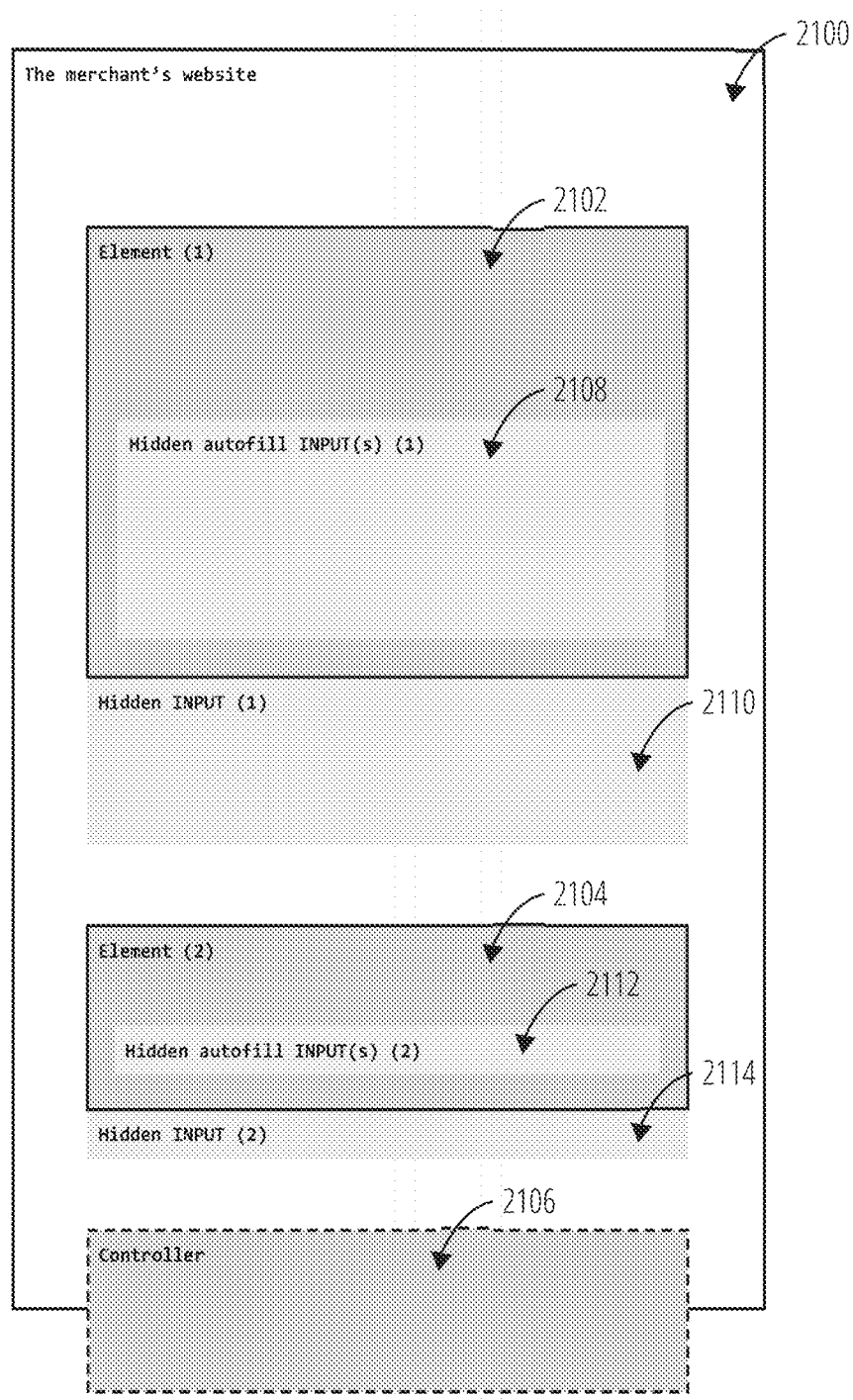
FIG. 21 is a block diagram showing aspects of iframes, elements and related data entry elements embedded in a merchant's webpage, in accordance with some example embodiments.

As mentioned further above, an embedded controller iframe (for example, controlled by a payment processor, such as Stripe) in a merchant's webpage can enable autofill across, not just within, data entry elements. In this regard, reference is made to FIG. 21, which relates to a payment processor. A merchant's website page 2100 appears. The merchant's site can include additional merchant-created forms, fields, images, text, and so forth. Stripe's embedded iframes do not interact with parts of the merchant's site that were not created by Stripe. Stripe's elements include element (1) 2102, which is an iframe embedded in the page 2100 and hosted on js.stripe.com. The iframe contains code that handles customer data and simplifies the merchant's payment integration. There can be multiple elements on the page, such as element (2) 2104, depending on how many iframes and how much functionality the merchant wishes to use. A third iframe, a hidden controller 2106, shown in dotted outline, is provided at the bottom of the page 2100, and is hosted on js.stripe.com. The hidden controller 2106 contains code that communicates with api.stripe.com (an Application Programming Interface, or API) and reconciles states or content between elements, in this case elements (1) 2102 and (2) 2104 in the manner described further above.

Element (1) 2102 has an associated hidden autofill input field (1) within the iframe 2108, and a hidden input field 2110 outside the iframe 2108. Similarly element (2) 2104 has an associated hidden autofill input field (2) within the iframe 2112, and a hidden input field 2114 outside the iframe 2112. For convenience and accuracy, there may be certain information (data) that could helpfully be entered or appear in both elements (1) 2102 and (2) 2104 at the same time, for example a card number or a card expiry date. It may be said in this instance that element (1) 2102 is autofill-able as a group with other elements, or autofill-able across fields. Data may be entered by a user with it appearing in different fields at the same time. If element (1) 2102 is to be autofill-able as a group with other elements (e.g., a card number element and a card expiry element), hidden input fields, such as hidden input field 2110, are embedded within the page 2100 and associated with element (1) 2102, more specifically the iframe 2108 of element (1) 2102, so that browser autofill tools (e.g., Safari, Chrome) can supply autofill data to this iframe 2108. The controller 2106 is used to pass the autofill data to other elements, e.g., element (2) 2104, that need to have this data to be autofilled by it. Thus, for the mobile Safari keyboard's arrow keys to recognize, for example, that there is a focusable element nearby, the extra hidden input field 2110 is inserted into the merchant's page 2100. The element (1) 2102 iframe 2108 listens for a 'focus' event on this input field 2110 and redirects the focus to the corresponding element, or elements. A similar arrangement may be employed for element (2) 2104 using hidden autofill input field (2) in iframe 2112 and hidden input field 2114 outside the iframe 2112.

Thus, in some embodiments, there is provided a payment processor system for conducting a transaction between a merchant site including a web page and an electronic user device using a payment processor, the merchant site associated with a client-side application and a server-side application for hosting the merchant site, wherein the client-side application executes on the electronic user device, the system comprising: a network; processors; and a memory storing instructions that, when executed by at least one processor among the processors, cause the payment processor system to perform operations comprising, at least: providing a payment element in the web page of the merchant site, the payment element hosted by a server at the payment processor, the payment element including at least one visually configurable data entry element; receiving payment information from the client-side application relating to a payment instrument entered into the at least one visually configurable data entry element; and based on at least one aspect of the entered payment information or a user device display criterion, dynamically adjusting, during a user data entry session, a visual configuration of the at least one visually configurable data entry element. The operations may comprise further method steps as summarized below.

Further, in some embodiments, there is provided a payment processor system for conducting a transaction between a merchant site including a web page, and an electronic user device using the payment processor, the merchant site associated with a client side application and a server-side application for hosting the merchant site, wherein the client-side application executes on the electronic user device, the system comprising: a network; processors; and a memory storing instructions that, when executed by at least one processor among the processors, cause the payment processor system to perform operations comprising, at least: providing a configurable payment element in the web page of the merchant site, the payment element hosted by a server at the payment processor, the configurable payment element including a plurality of data entry elements; receiving payment information from the client-side application relating to a payment instrument, the payment information entered into one or more of the plurality of data entry elements of the configurable payment element; providing a controller iframe in the web page to reconcile a data entry element state or content across the plurality of data entry elements; reconciling a data entry element state or content across the plurality of data entry elements; and using the controller iframe to coordinate a submission to an API or the payment processor of payment information entered into the one or more of the plurality of data entry elements. The operations may comprise further method steps as summarized below.

Some embodiments of the present inventive subject matter include methods for conducting a transaction between a merchant site including a web page, and an electronic user device using the payment processor, the merchant site associated with a client side application and a server-side application for hosting the merchant site, wherein the client-side application executes on the electronic user device.

Figure 22:
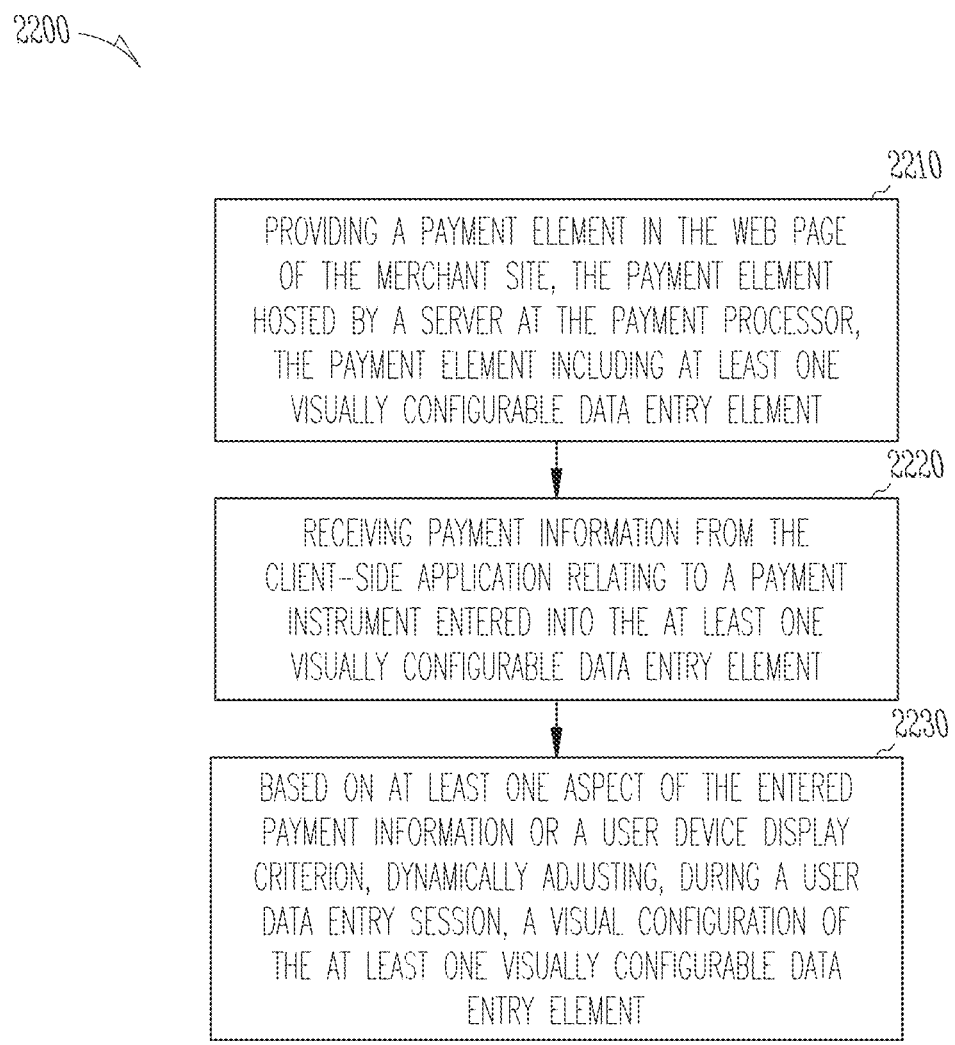
FIGS. 22-23 are flowcharts for methods for conducting a transaction between a merchant site including a web page, and an electronic user device using the payment processor, the merchant site associated with a client side application and a server-side application for hosting the merchant site, in accordance with some example embodiments.

With reference to FIG. 22, a method 2200 is provided for conducting at a payment processor a transaction between a merchant site including a web page and an electronic user device using the payment processor, the merchant site associated with a client-side application and a server-side application for hosting the merchant site, wherein the client-side application executes on the electronic user device. In some examples, the method 2200 comprises at least: at 2210, providing a payment element in the web page of the merchant site, the payment element hosted by a server at the payment processor, the payment element including at least one visually configurable data entry element; at 2220, receiving payment information from the client-side application relating to a payment instrument entered into the at least one visually configurable data entry element; and, at 2230, based on at least one aspect of the entered payment information or a user device display criterion, dynamically adjusting, during a user data entry session, a visual configuration of the at least one visually configurable data entry element.

In some examples, dynamically adjusting, during a user data entry session, the visual configuration of the at least one visually configurable data entry element includes adjusting one or both of a size and a width of the at least one visually configurable data entry element.

In some examples, the method 2200 further comprises creating a token for the received payment information sent by the client-side application, the token functioning as a proxy for the payment information, and electronically sending the token to the client-side application, the client-side application electronically sending the token to the server-side application for conducting the transaction without the server-side application being exposed to the payment information.

In some examples, the at least one aspect of the entered payment information includes a font or a format of the payment information entered into the at least one visually configurable data entry element. In some examples, herein the at least one aspect of the entered payment information relates to payment information regulated by or associated with Payment Card Industry (PCI) regulations.

In some examples, the method 2200 further comprises deriving a national identity of a payment instrument based at least on a portion of payment information entered into the at least one visually configurable data entry element; supplementing or withholding the display of a second data entry element in the web page of the merchant site based at least in part on the national identity of the payment instrument; and based on the supplementation or withholding of the second data entry element, using the iframe controller to adjust a visual configuration of the at least one visually configurable data entry element. In some examples, the payment instrument is a payment card.

In some examples, the method 2200 further comprises providing a controller iframe in the web page to coordinate a submission to the payment processor of payment information entered into the at least one visually configurable data entry element, wherein the controller iframe is withheld from view in the web page, and wherein the method further comprises using the withheld-from-view controller iframe to adjust dynamically, during a user data entry session, a visual configuration of the at least one visually configurable data entry element.

Figure 23:
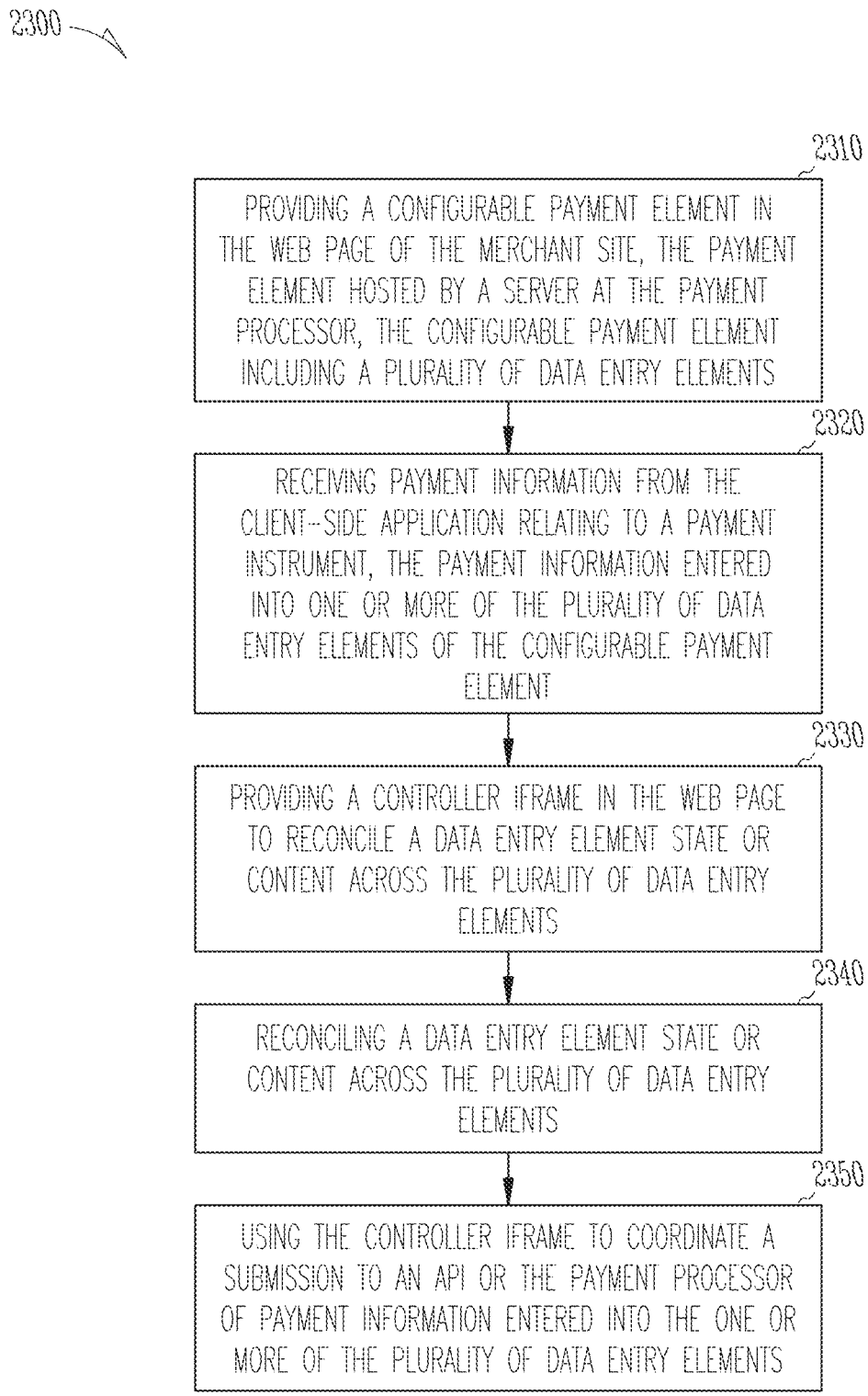

With reference to FIG. 23, another method 2300 is provided for conducting at a payment processor a transaction between a merchant site including a web page, and an electronic user device using the payment processor, the merchant site associated with a client side application and a server-side application for hosting the merchant site, wherein the client-side application executes on the electronic user device. In some examples, the method 2300 comprises, at least: at 2310, providing a configurable payment element in the web page of the merchant site, the payment element hosted by a server at the payment processor, the configurable payment element including a plurality of data entry elements; at 2320, receiving payment information from the client-side application relating to a payment instrument, the payment information entered into one or more of the plurality of data entry elements of the configurable payment element; at 2330, providing a controller iframe in the web page to reconcile a data entry element state or content across the plurality of data entry elements; at 2340, reconciling a data entry element state or content across the plurality of data entry elements; and, at 2350, using the controller iframe to coordinate a submission to an API or the payment processor of payment information entered into the one or more of the plurality of data entry elements.

In some examples, the method 2300 may further comprise creating a token for the received payment information sent by the client-side application, the token functioning as a proxy for the payment information; and electronically sending the token to the client-side application, the client-side application electronically sending the token to the server-side application for conducting the transaction without the server-side application being exposed to the payment information.

In some examples, at least one of the plurality of data entry elements in the configurable payment element is a configurable data entry element, and the method 2300 may further comprise concealing the controller iframe from user view in the web page of the merchant site, and further using the hidden controller iframe at least in part to adjust dynamically a visual configuration of the configurable data entry element.

In some examples, the method 2300 may further comprise providing a hidden autofill input field, and a hidden input field, in the web page; associating the hidden autofill input field, and the hidden input field, with at least a portion of the plurality of data entry elements, wherein the portion of data entry elements are autofill-able across fields; receiving, at the iframe controller, from a browser autofill tool, autofill information for display in the portion of data entry elements; and using the hidden autofill input field and hidden input tool at least in part to display the autofill information across the portion of data entry elements.

In some examples, the method 2300 may further comprise concealing the controller iframe from user view in the web page of the merchant site; and further using the hidden controller iframe at least in part, substantially in conjunction: to adjust dynamically the visual configuration of at least one data entry element in the plurality of data entry elements of the configurable payment element; and to display the autofill information across the portion of data entry elements.

In some examples, the method 2300 may further comprise deriving a national identity of a payment instrument based at least on a portion of payment information entered into a first data entry element of the plurality of data entry elements; supplementing or withholding the display of a second data entry element in the web page of the merchant site based at least in part on the national identity of the payment instrument; and based on the supplementation or withholding of the second data entry element, using the iframe controller to adjust a visual configuration of at least one of the plurality of data entry elements. In some examples, the payment instrument may be a payment card.

Some embodiments include machine-readable media including instructions which, when read by a machine, cause the machine to perform the operations of any one or more of the methodologies summarized above, or described elsewhere herein.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
providing, by a payment processor, a payment element in a web page of a merchant site, the payment element including at least one visually configurable data entry element displayed on a client-side device;
receiving, by the payment processor, payment information from the client-side device relating to a payment instrument entered into the at least one visually configurable data entry element;
based on at least one aspect of the entered payment information, dynamically adjusting, by the payment processor, during a user data entry session, a visual configuration of the at least one visually configurable data entry element;
supplementing or withholding, by the payment processor, display of a second data entry element in the web page of the merchant site based at least in part on an attribute of the payment instrument; and adjusting, using a controller, a visual configuration of the at least one visually configurable data entry element based on the supplementing or withholding of the display of the second data entry element.

2. The method of claim 1, wherein the payment element is hosted by a server at the payment processor.

3. The method of claim 1, wherein the payment element includes a plurality of data entry elements and the method further comprises:
providing, by the payment processor, a controller iframe in the web page to reconcile a data entry element state or content across the plurality of data entry elements; and
reconciling, by the controller iframe, a data entry element state or content across the plurality of data entry elements.

4. The method of claim 3, further comprising coordinating, by the controller iframe, a submission to the payment processor of payment information entered into one or more of the plurality of data entry elements.

5. The method of claim 3, further comprising coordinating, by the controller iframe, a submission to an API of payment information entered into one or more of the plurality of data entry elements.

6. The method of claim 3, wherein the controller iframe is hidden.

7. The method of claim 1, wherein the dynamically adjusting, during a user data entry session, the visual configuration of the at least one visually configurable data entry element includes adjusting one or both of a size and a width of the at least one visually configurable data entry element.

8. The method of claim 1, further comprising:
creating, by the payment processor, a token for the received payment information sent by the client-side device, the token functioning as a proxy for the payment information;
electronically sending, by the payment processor, the token to the client-side device; and
electronically sending, by the client-side device, the token to the merchant site for conducting a transaction without the merchant site being exposed to the payment information.

9. The method of claim 1, further comprising:
deriving, by the payment processor, the attribute of the payment instrument based at least on a portion of the payment information entered into the at least one visually configurable data entry element.

10. A non-transitory computer-readable medium having stored thereon instructions to cause a payment processor to execute a method, the method comprising:
providing, by the payment processor, a payment element in a web page of a merchant site, the payment element including at least one visually configurable data entry element displayed on a client-side device;
receiving, by the payment processor, payment information from the client-side device relating to a payment instrument entered into the at least one visually configurable data entry element;
based on at least one aspect of the entered payment information, dynamically adjusting, by the payment processor, during a user data entry session, a visual configuration of the at least one visually configurable data entry element;
supplementing or withholding, by the payment processor, display of a second data entry element in the web page of the merchant site based at least in part on an attribute of the payment instrument; and
adjusting, using a controller, a visual configuration of the at least one visually configurable data entry element based on the supplementing or withholding of the display of the second data entry element.

11. A system comprising:
a payment processor; and
non-transitory computer-readable medium having stored thereon instructions to cause the payment processor to execute a method, the method comprising:
providing, by the payment processor, a payment element in a web page of a merchant site, the payment element including at least one visually configurable data entry element displayed on a client-side device;
receiving, by the payment processor, payment information from the client-side device relating to a payment instrument entered into the at least one visually configurable data entry element; and
based on at least one aspect of the entered payment information, dynamically adjusting, by the payment processor, during a user data entry session, a visual configuration of the at least one visually configurable data entry element;
supplementing or withholding, by the payment processor, display of a second data entry element in the web page of the merchant site based at least in part on an attribute of the payment instrument; and
adjusting, using a controller, a visual configuration of the at least one visually configurable data entry element based on the supplementing or withholding of the display of the second data entry element.

12. The system of claim 11, wherein the payment element is hosted by a server at the payment processor.

13. The system of claim 11, wherein the payment element includes a plurality of data entry elements and the method further comprises:
providing, by the payment processor, a controller iframe in the web page to reconcile a data entry element state or content across the plurality of data entry elements; and
reconciling, by the controller iframe, a data entry element state or content across the plurality of data entry elements.

14. The system of claim 13, wherein the method further comprises coordinating, by the controller iframe, a submission to the payment processor of payment information entered into one or more of the plurality of data entry elements.

15. The system of claim 13, wherein the method further comprises coordinating, by the controller iframe, a submission to an API of payment information entered into one or more of the plurality of data entry elements.

16. The system of claim 13, wherein the controller iframe is hidden.

17. The system of claim 11, wherein the dynamically adjusting, during a user data entry session, the visual configuration of the at least one visually configurable data entry element includes adjusting one or both of a size and a width of the at least one visually configurable data entry element.

18. The system of claim 11, wherein the method further comprises:
creating, by the payment processor, a token for the received payment information sent by the client-side device, the token functioning as a proxy for the payment information;
electronically sending, by the payment processor, the token to the client-side device; and electronically sending, by the client-side device, the token to the merchant site for conducting a transaction without the merchant site being exposed to the payment information.

19. The system of claim 11, wherein the method further comprises:
   deriving, by the payment processor, the attribute of the payment instrument based at least on a portion of the payment information entered into the at least one visually configurable data entry element.

20. The system of claim 11, wherein the method further comprises:
   generating a plurality of hidden controller iframes in the web page; and
   aggregating, by one of the hidden controller iframes, payment information from the at least one visually configurable data entry element.

* * * * *